(12) United States Patent
Mantov et al.

(10) Patent No.: US 12,132,406 B2
(45) Date of Patent: *Oct. 29, 2024

(54) HIGH AND MEDIUM VOLTAGE POWER CONVERTERS WITH SWITCH MODULES PARALLEL DRIVING A SINGLE TRANSFORMER PRIMARY

(71) Applicant: Solid State Power LLC, Dallas, TX (US)

(72) Inventors: George Mantov, Sofia (BG); Ken A. Wallace, Lewis Center, OH (US); Plamen Jordanoff, Dallas, TX (US)

(73) Assignee: Solid State Power LLC, Dallas, TX (US)

( * ) Notice: Subject to any disclaimer, the term of this patent is extended or adjusted under 35 U.S.C. 154(b) by 216 days.

This patent is subject to a terminal disclaimer.

(21) Appl. No.: 17/816,824

(22) Filed: Aug. 2, 2022

(65) Prior Publication Data
US 2023/0025144 A1 Jan. 26, 2023

Related U.S. Application Data

(63) Continuation-in-part of application No. PCT/US2022/073660, filed on Jul. 12, 2022, and a
(Continued)

(51) Int. Cl.
*H02M 3/335* (2006.01)
(52) U.S. Cl.
CPC ... *H02M 3/33573* (2021.05); *H02M 3/33576* (2013.01)

(58) Field of Classification Search
CPC ......... H02M 3/33573; H02M 3/33576; H02M 3/01; H02M 3/1584; H02M 3/285; H02M 1/0074
See application file for complete search history.

(56) References Cited

U.S. PATENT DOCUMENTS 6,392,902 B1 * 5/2002 Jang ................. H02M 3/33573
363/56.02
8,385,504 B2 2/2013 Hattrup
(Continued)

OTHER PUBLICATIONS

Johann W. Kolar, Jonas E. Huber, Solid-State Transformers: Key Design Challenges, Applicability, and Future Concepts, APEC 2016 conference, Mar. 20-24, 2016, Long Beach, California, USA Retrieved from <https://www.bes-publications.ee.ethz.ch/uploads/tx_ethpublications/apec_2016_sst_tutorial_FINAL-1.pdf> Apr. 19, 2022. See slide #75. Mar. 20, 2016.

(Continued)

*Primary Examiner* — Kyle J Moody
(74) *Attorney, Agent, or Firm* — UB Greensfelder LLP; Matthew J. Schonauer

(57) ABSTRACT

A multilink power converter with reduced winding voltage is disclosed, as well as various applications. In the disclosed embodiments, multiple primary switch modules have their inputs connected in series while using a single transformer winding connected in parallel to the modules' outputs through voltage blocking capacitors. Medium voltage solid-state transformers are presented, including three-phase power converters. Also presented are embodiments utilizing common mode inductors to equalize the currents of the high voltage modules.

29 Claims, 25 Drawing Sheets

Related U.S. Application Data continuation-in-part of application No. 17/305,638, filed on Jul. 12, 2021, now Pat. No. 11,463,011.

(60) Provisional application No. 62/705,779, filed on Jul. 15, 2020.

(56) References Cited

U.S. PATENT DOCUMENTS

| | | | |
|---|---|---|---|
| 11,463,011 B1 * | 10/2022 | Wallace | H02M 3/33571 |
| 2012/0074864 A1 | 3/2012 | Ding | |
| 2014/0346962 A1 | 11/2014 | Sanders | |
| 2019/0280586 A1 | 9/2019 | Chen | |
| 2020/0412273 A1 | 12/2020 | Lukic | |
| 2021/0152080 A1 | 5/2021 | Lukic | |
| 2021/0359594 A1 | 11/2021 | Zhang | |

OTHER PUBLICATIONS

Alex Q. Huang, Solid State Transformer and FREEDM System Power Management Strategies, FREEDM Systems Center Seminar Series, Nov. 2, 2016, NC State University. Retrieved from <https://www.freedm.ncsu.edu/wp-content/uploads/2016/11/FREEDM-Seminar-Series-4-Power-Management-with-SSTs-by-Alex-Huang.pdf> Apr. 19, 2022. See p. 11. Nov. 2, 2016.

Watson Collins, DC Conversion Equipment Connected to the Medium-Voltage Grid for Extreme Fast Charging Utilizing Modular and Interoperable Architecture, 2021 DOE Vehicle Technologies Office Annual Merit Review, Jun. 24, 2021, virtual meeting, USA. Retrieved from <https://www.energy.gov/sites/default/files/2021-06/elt236_collins_2021_0_5-14_420pm_KF_TM.pdf> Apr. 19, 2022. See p. 9. Jun. 24, 2021.

* cited by examiner

Fig. 15A
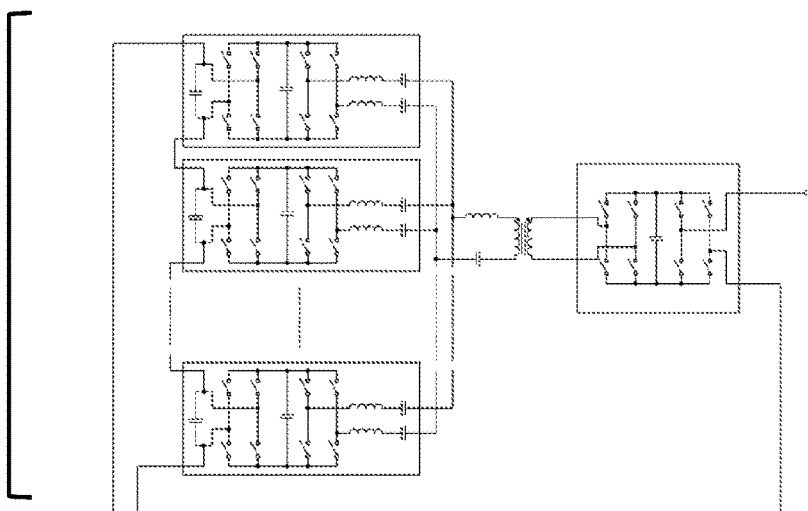
Fig. 15B
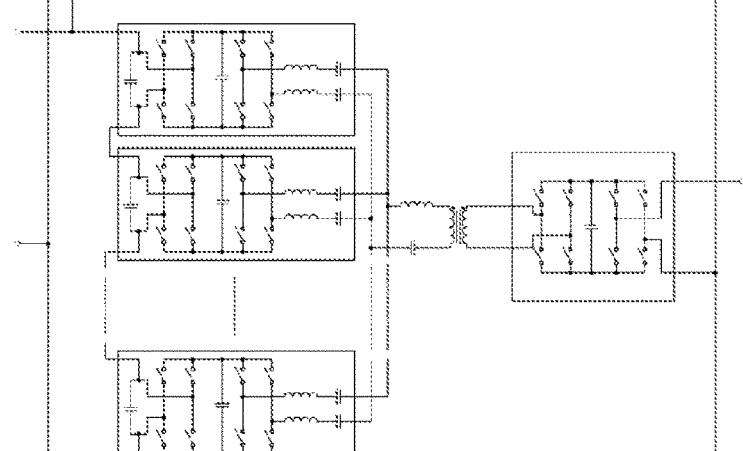
Fig. 15C
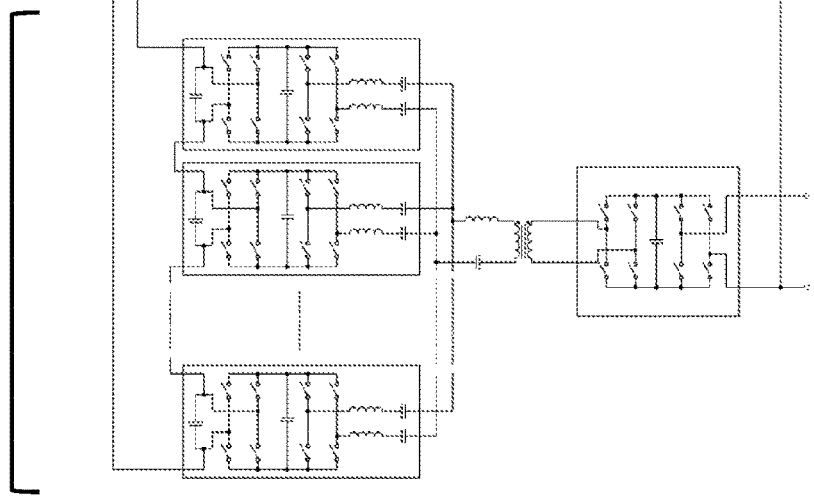
Figure 15

HIGH AND MEDIUM VOLTAGE POWER CONVERTERS WITH SWITCH MODULES PARALLEL DRIVING A SINGLE TRANSFORMER PRIMARY

CROSS-REFERENCE TO RELATED APPLICATIONS

This application claims the benefit under 35 U.S.C. § 120 of U.S. patent application Ser. No. 17/305,638 filed 12 Jul. 2021 which in turn claims the benefit of and priority to U.S. provisional patent application No. 62/705,779 filed 15 Jul. 2020, and international patent application number PCT/US2022/073660 filed 12 Jul. 2022. The disclosures of each of the foregoing applications are hereby incorporated by reference as if fully recited herein.

TECHNICAL FIELD

The present invention relates to the field of power conversion. Specifically, but not by way of limitation, the disclosure includes a novel modular power converter with multiple modules driving a single transformer by applying its outputs in parallel over a single transformer winding or windings, and power electronics applications thereof.

BACKGROUND OF THE INVENTION

This section provides background information to facilitate a better understanding of the various aspects of the disclosure. The statements in this section of this document are to be read in this light, and not as admissions of prior art.

Medium voltage (MV) and high voltage (HV) converters and distribution transformers (DTs) are key components of the electrical grid providing voltage transformation and isolation from medium and high voltage alternating current (AC) distribution lines to lower-level AC or DC used by end customers. In recent years, both the supply of and demand for electrical power has begun to undergo major changes. On one hand the share of renewable energy generation has increased manifold, while on the other hand there has been a surge in demand of electronic devices requiring high quality power and/or direct current (DC) power. These changes have brought new challenges to the electrical grid. Even though existing conventional DTs comply with current standards, they lack many capabilities which are or will be required by the evolving grid of the future. For example, they are not capable of power factor correction, voltage regulations, inherent DC connectivity, monitoring and control, stand-by energy loss reduction, uninterruptable power supply (UPS) functionality, phase current balancing and others. Additionally, from an environmental and safety point of view, conventional DTs are large, heavy, use large amounts of raw materials and pose a number of safety and environmental hazards.

A solid-state transformer (SST) utilizing wide-bandgap semiconductors offers a solution to the inadequacies of low frequency DTs. The SST uses a medium or high frequency transformer with power semiconductors connected in such a way that the SST replicates all the performance parameters of the conventional DT while also offering value-added features and opportunities for future upgrades and development.

Currently, there are three basic approaches to developing SST topology:
1. SST consisting of a number of equal modules connected in series at the HV port of the device. This enables the use of power semiconductors with lower voltage rating compared to that supplied by the grid operator. Every module consists of a power electronics converter, which includes a medium/high frequency power transformer. This approach significantly reduces the size and weight compared to the conventional unit.
2. SST utilizing electronic converter module or multiple modules rated at full voltage. The modules use conventional power conversion topologies with HV composite switches. One of the most common approaches is by using cascade-based HV switches.
3. SST utilizing a multiport transformer with a number of parallel windings on one side and multiple switching modules connecting each one to a separate transformer winding.

These three topology types have some issues that limit key advantages of SSTs such as significant size reduction, total efficiency, THD and reactive power consumption of the converter. A further drawback of existing solutions is the accompanying corona effect which can cause long term degradation of the converter and can significantly reduce its lifespan.

Therefore, a need exists in the field of SST technology as well as in any other cases when high voltage needs to be converted, for a power converter converting HV AC which addresses the above issues while still delivering the full range of SST capabilities. Furthermore, there exists a need for power converters operable while connected directly to the present MV or HV AC power grid, as well as for devices connected directly to the emerging HV DC distribution lines. No known references, taken alone or in combination, are seen as teaching or suggesting the presently claimed invention.

BRIEF SUMMARY OF THE INVENTION

The present invention comprises a novel method of connecting the outputs of several converters or switch modules to a single transformer primary winding. When the individual converters produce high frequency (HF) voltage and current with a similar amplitude but different absolute voltage offset, they can deliver a sum of output currents to a single transformer primary winding when voltage blocking capacitors are used.

In some embodiments, the voltage blocking capacitors can also serve as resonant capacitors when a resonant conversion topology is implemented. In this case, the sum of the capacitance of the voltage blocking capacitors of all the modules can be responsible for a part or the whole of the resonant capacity. The primary function of the voltage blocking capacitors is to provide the right voltage offset to each of the power converter module outputs and to enable connecting all the outputs to a single transformer winding. This allows HV to be converted by using switches rated for lower voltage, as well as using lower voltage transformers. Also, when a converter is bidirectional or converts low voltage to HV, the invention allows lower voltage semiconductors and lower voltage transformers to be used in its output section.

In some embodiments, the switch modules parallel driving a transformer winding can be utilized for MV AC/AC SST, while in other cases a MV AC/DC SST or MV DC/DC SST can be based on the same principle. In the existing utility grid, which is predominantly three-phase, a three-phase embodiment of the converters based on voltage offset capacitors is also desirable. In some of the presented embodiments special techniques for reduction of voltage and current disbalance between the converters modules is presented. The essence of the disclosed embodiments is to present a variety of power converters based on technology allowing series connected switch modules to drive in parallel a transformer winding, thus allowing HV or MV converters utilizing lower voltage power semiconductors to be built. Also, when a converter is bidirectional or converts low voltage to high voltage, the same devices allow lower voltage semiconductors and lower voltage transformers to be used in order to produce HV or MV AC or DC.

It is an object of this invention to provide power converters, components and features of the type generally described herein, being adapted for the purposes set forth herein, and overcoming disadvantages found in the prior art. These and other advantages are provided by the invention described and shown in more detail below.

BRIEF DESCRIPTION OF THE SEVERAL VIEWS OF THE DRAWINGS

Novel features and advantages of the present invention, in addition to those mentioned above, will become apparent to those skilled in the art from a reading of the following detailed description in conjunction with the accompanying drawings wherein identical reference characters refer to identical parts and in which:

FIG. 15 is a schematic diagram of an exemplary power converter embodiment for three-phase AC/AC SST;

DETAILED DESCRIPTION OF THE INVENTION

The terminology used herein is for the purpose of describing the embodiments and is not intended to be a limiting factor of the invention.

New methods of connecting multiple power converter modules with one side of the modules connected in series or in parallel, utilizing voltage blocking capacitors is disclosed herein. In the following description, for the purpose of explanation, numerous specific details are set forth in order to provide a thorough understanding of the present invention. It will be evident to one skilled in the art and the field, however, that the present invention may be made and practiced without these specific details.

The present disclosure is to be viewed as an elaboration of the invention and is not intended to limit the invention to the embodiments illustrated by the figures or the description below. The present invention will be described by referencing the figures representing the preferred embodiments.

Figure 1:
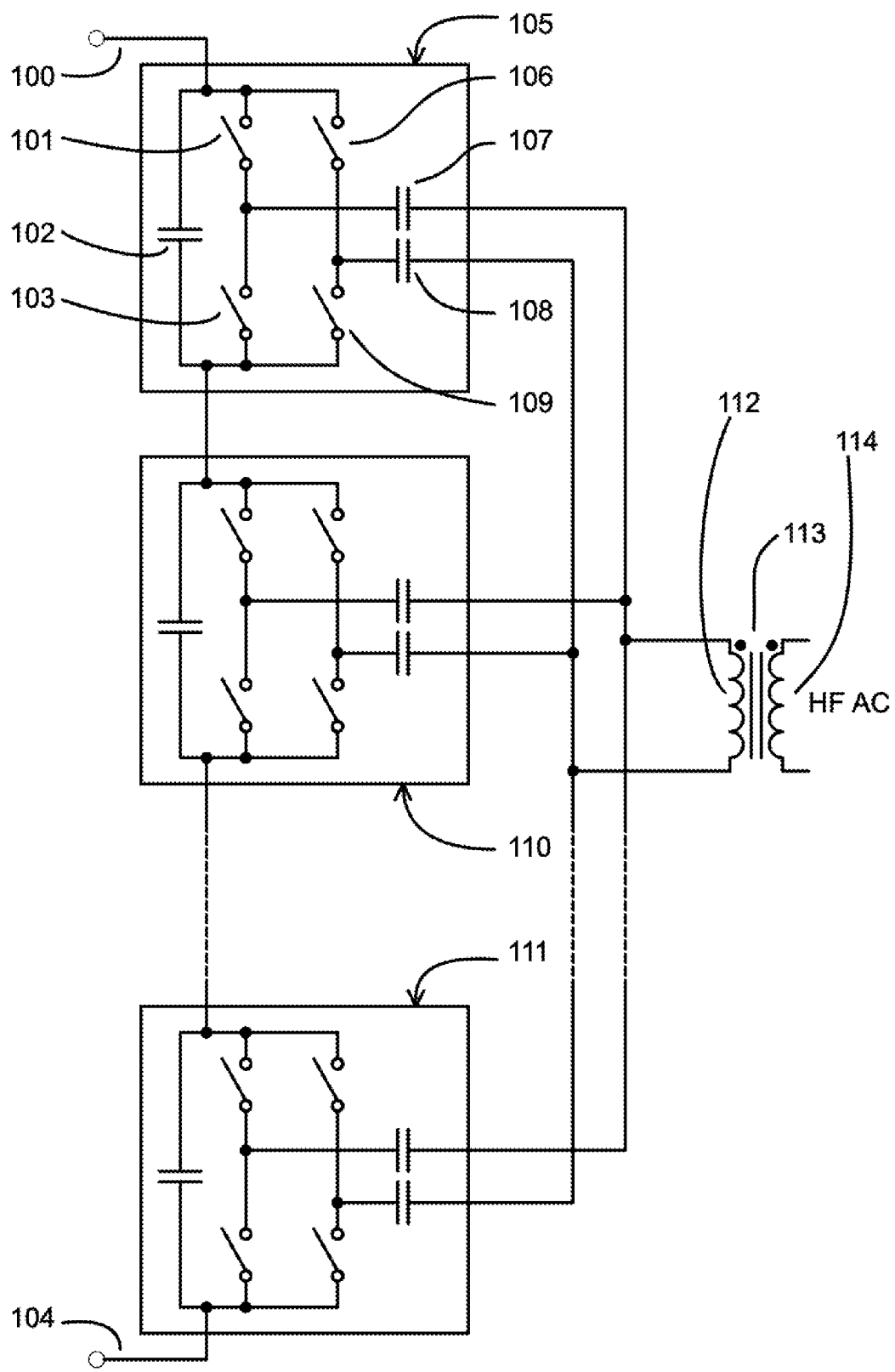
FIG. 1 is a schematic diagram of an exemplary power converter embodiment having multiple full bridge converter modules with primary sides connected in series and secondary sides connected in parallel through voltage blocking capacitors.

The embodiment of FIG. 1 shows primary switch bridge modules 105, 110, 111 connected in series across high voltage (HV) input terminals 100 and 104. The HV input can be DC or low frequency (LF) AC such as the 50/60 Hz grid (or mains) voltage from the electric utility. The dotted lines between the top two modules and the lower one indicate that more series modules could be used.

The top module will be described in detail. The remaining modules are similar. A module consists of two series switches forming what is known in the art as a "totem pole." Switches 101 and 103 make up one totem pole while 106 and 109 make up another. The two totem poles are connected in parallel to form a bridge circuit. The two totem poles are driven at high frequency (HF) out of phase, that is diagonal switches close and open together. For a typical application, the HF drive would be in the 20-100 kHz frequency range although the switch frequency may go beyond this range.

The four switches can be unidirectional or bi-directional for current flow and can be implemented using several semiconductor switch technologies such as IGBTs, MOSFETs or others. If the HV input is DC, then the switches can be unidirectional. If the HV input is AC, then bi-directional switches are required.

The bridge circuit has bypass capacitor 102 connected in parallel which stabilizes the voltage short term. The switch nodes of the two totem poles connect to blocking capacitors 107 and 108. The voltage at the switch nodes can be square waves, 180° out of phase with small deadtimes. A deadtime is a short gap between the ON times of the totem pole switches. This gap is small compared to the HF switch drive period so is typically less than one microsecond. The purpose of the deadtime is to allow low-loss switching to occur, a process known in the art as zero-voltage-switching or ZVS. Thus, the voltage out of the bridge (between the switch nodes) is a symmetric HF AC waveform.

The voltage blocking capacitors 107 and 108, as well as the voltage blocking capacitors associated with each switch bridge module are a key part of the invention, because they absorb different amounts of DC (or LF AC) voltage so the HF AC output of each module can be connected in parallel to feed a single transformer 113. Capacitors 107 and 108 block DC (or LF AC) but allow HF AC to transfer power.

The common load is HF transformer 113, with primary winding 112. The secondary winding 114 of transformer 113 goes on to rectifiers or active circuits to generate the desired DC or AC output. These circuits are not shown in connection with FIG. 1. It is also possible for the circuit on FIG. 1 to accept power through winding 114 and to process it up to terminals 100 and 104, delivering in this way high voltage either AC or DC.

Figure 2:
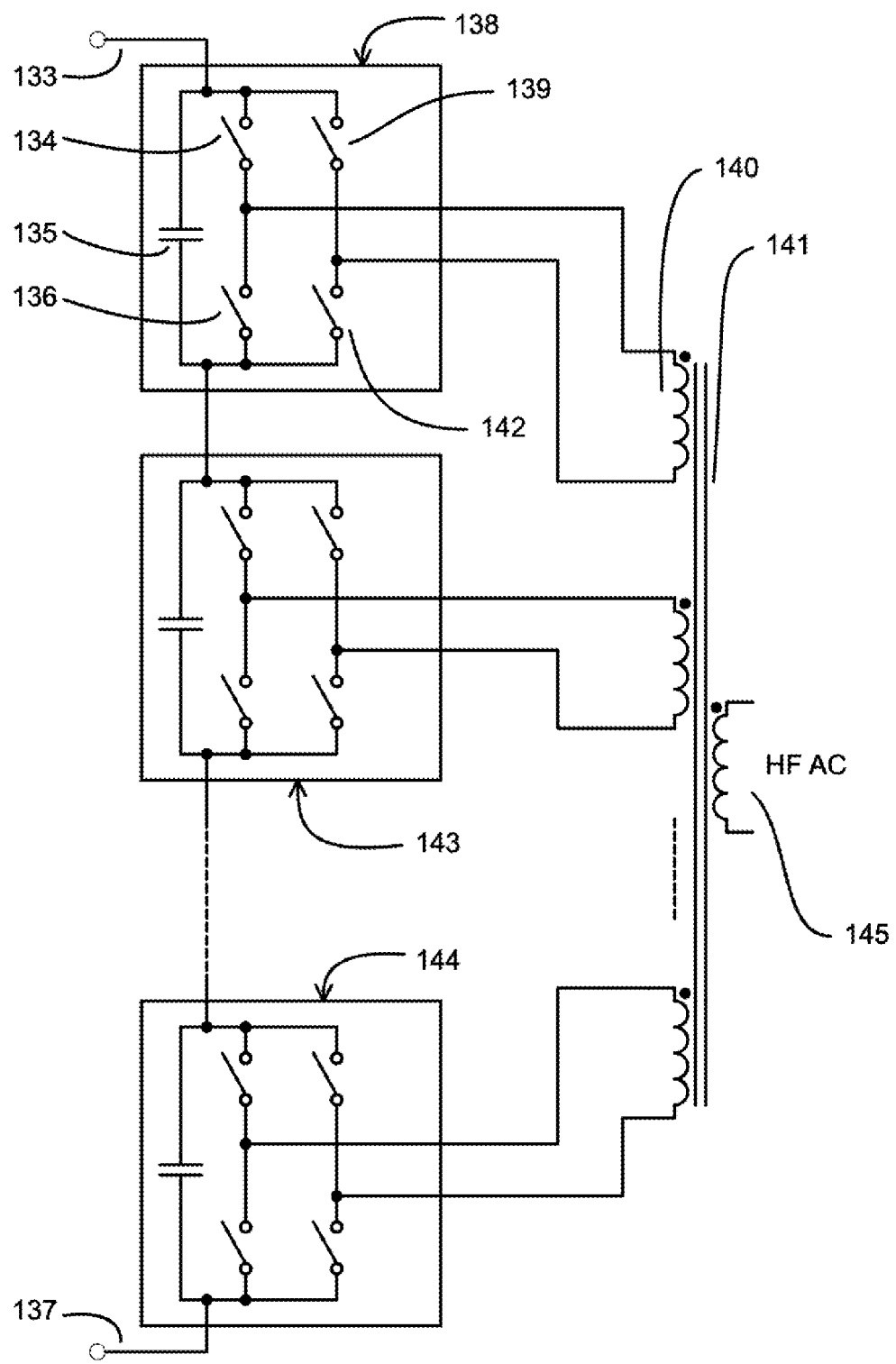
FIG. 2 is a schematic diagram of a prior art power converter, consisting of multiple full bridge converter modules, with primary sides connected in series and secondary sides connected to individual transformer windings.

A prior art embodiment is shown in connection with FIG. 2. It shows switch bridge modules 138, 143, 144 connected in series across high voltage (HV) input terminals 133 and 137. The HV input can be DC or low frequency (LF) AC such as the 50/60 Hz grid (or mains) voltage from the electric utility. The dotted lines between the top two modules and the lower one just indicate that more series modules could be used.

The output of the switch bridge module 138 is connected to the HF transformer winding 140. The outputs of all the other switch bridge modules are also connected to dedicated windings of the HF transformer.

Figure 3:
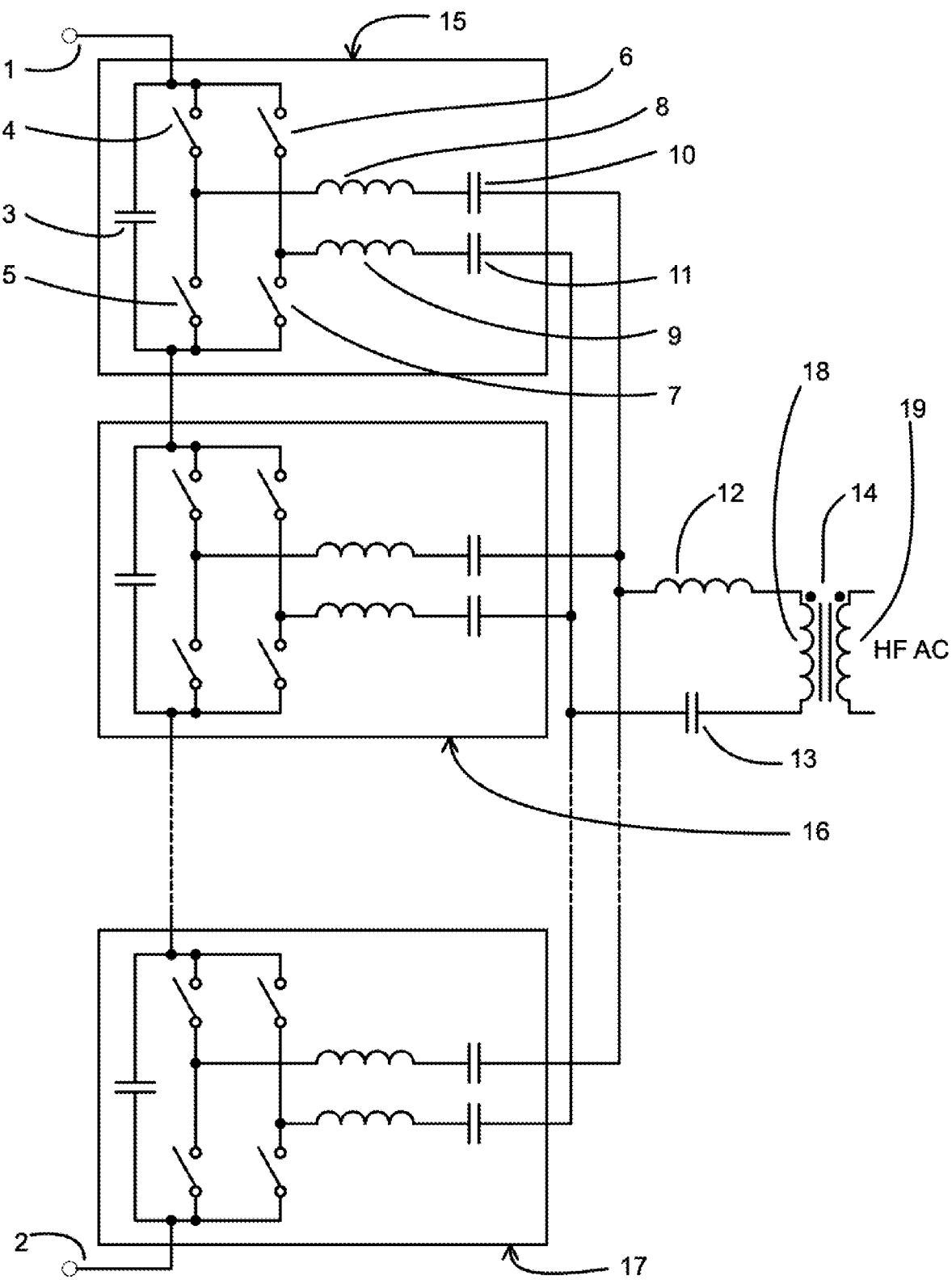
FIG. 3 is a schematic diagram of an exemplary power converter embodiment having resonant inductors in series with voltage blocking capacitors.

The embodiment of FIG. 3 shows switch bridge modules 15, 16, 17 connected in series across high voltage (HV) input terminals 1 and 2. The HV input can be DC or low frequency (LF) AC such as the 50/60 Hz grid (or mains) voltage from the electric utility. The dotted lines between the top two modules and the lower one just indicate that more series modules could be used.

The top module will be described in detail. The remaining modules are similar. A module consists of two series switches forming what is known in the art as a "totem pole." Switches 4 and 5 make up one totem pole while 6 and 7 make up another. The two totem poles are connected in parallel to form a bridge circuit. The two totem poles are driven at high frequency (HF) out of phase, that is diagonal switches close and open together. For a typical application, the HF drive would be in the 20-100 kHz frequency range although the switch frequency may go beyond this range.

The four switches can be unidirectional or bi-directional for current flow and can be implemented using several semiconductor switch technologies such as IGBTs, MOSFETs or others. If the HV input is DC, then the switches can be unidirectional. If the HV input is AC, then bi-directional switches are required.

The bridge circuit has bypass capacitor 3 connected in parallel which stabilizes the voltage short term. The switch nodes of the two totem poles connect to inductors 8 and 9. These inductors can be either coupled or not. The voltage at the switch nodes can be square waves, 180° out of phase with small deadtimes. A deadtime is a short gap between the ON times of the totem pole switches. This gap is small compared to the HF switch drive period so is typically less than one microsecond. The purpose of the deadtime is to allow low-loss switching to occur, a process known in the art as zero-voltage-switching or ZVS. Thus, the voltage out of the bridge (between the switch nodes) is a symmetric HF AC waveform.

After each inductor 8 and 9, there are blocking capacitors 10 and 11. These capacitors are a key part of the invention because they absorb different amounts of DC (or LF AC) voltage so the HF AC output of each module can be connected in parallel to feed a single transformer 14. Capacitors 10 and 11 block DC (or LF AC) but allow HF AC to transfer power.

The common load is HF transformer 14 which may have a primary discrete inductor 12 or the inductance may be inherent as leakage inductance. A popular power conversion circuit is a resonant scheme called an LLC circuit where transformer inductance is combined with a capacitor to utilize resonance to achieve the aforementioned low loss switching. Thus capacitor 13 and/or capacitors 10 and 11 may function as part of this resonant circuit.

One concern about paralleling the bridge modules at the output is cross-current. This is a current that flows between modules (not to the transformer) and increases losses. The purpose of inductors 8 and 9, which are part of the LLC resonant circuit, is to limit cross currents that may arise due to component or timing tolerances. Inductors 8 and 9 may be coupled, thus having some mutual inductance.

The secondary winding 19 of transformer 14 goes on to rectifiers or active circuits to generate the desired DC or AC output. These circuits are not shown in FIG. 3. It is also possible for the circuit on FIG. 3 to accept power through winding 19 and to process it up to terminals 1 and 2, delivering in this way high voltage either AC or DC.

Figure 4:
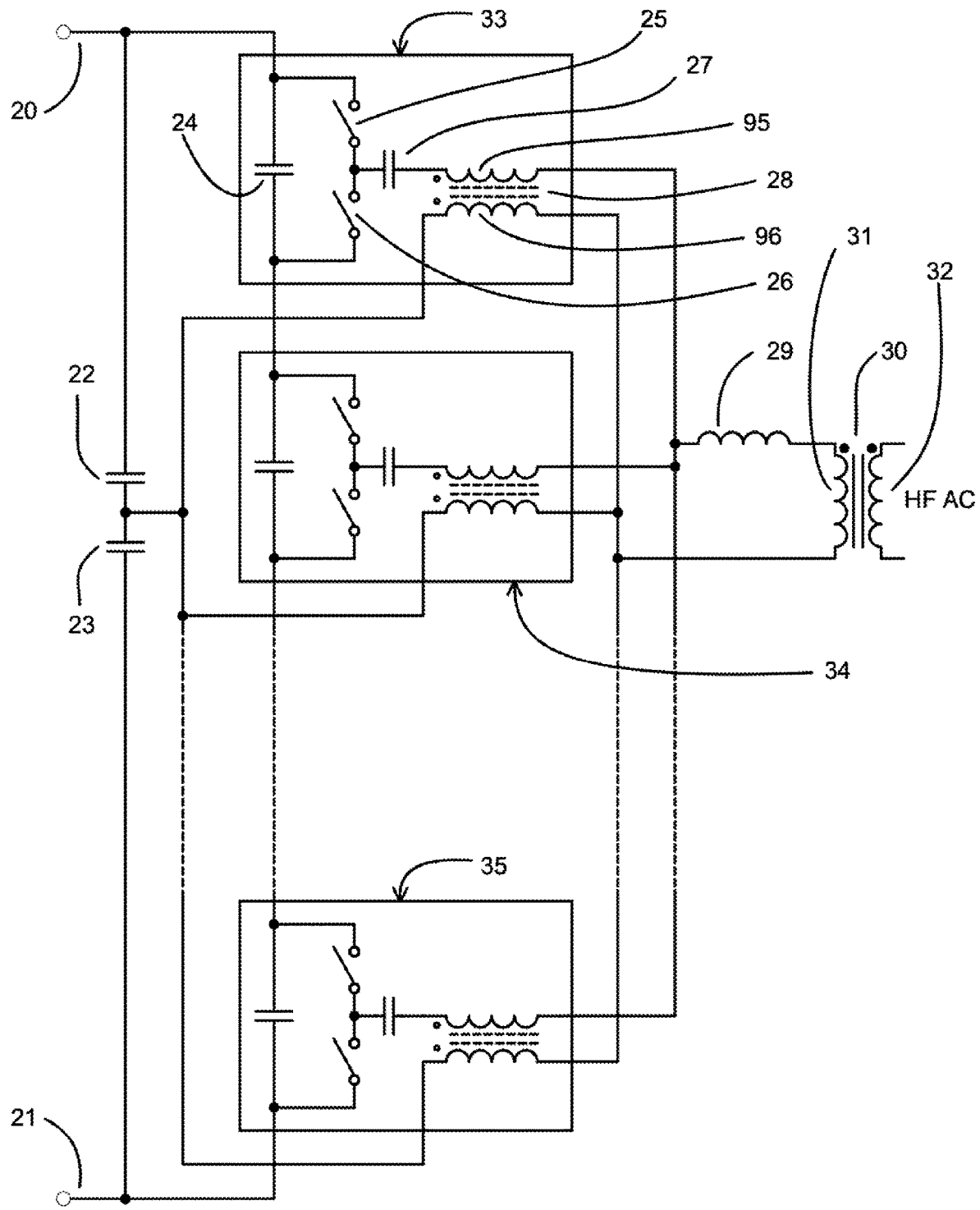
FIG. 4 is a schematic diagram of an exemplary power converter embodiment having multiple half bridge converter modules with primary sides connected in series and secondary sides connected in parallel through common mode inductors and voltage blocking capacitors.

The embodiment of FIG. 4 shows several power converters based on half bridge topology, specifically the modules 33, 34 and 35 connected in series across the high voltage (HV) input terminals 20 and 21. The HV input can be DC or low frequency (LF) AC such as the 50/60 Hz grid (or mains) voltage from the electric utility. Additional modules may be included between the modules 34 and 35 as indicated by the dotted lines.

The top module 33 will be described but the remaining modules are similar. The module consists of two series switches 25 and 26, and a bypass capacitor 24. The load is connected between the middle point of the switches 25 and 26 and the middle point of the bypass capacitors 22 and 23 which are common for all the modules. The core of this topology is known for anyone skillful in the art as a "half bridge."

The switches 25 and 26 make a half bridge converter together with the bypass capacitors 22 and 23. Note that the bypass capacitors 22 and 23 shown here are common for all the modules, although in some embodiments different bypass capacitors may be associated with each module.

The switches 25 and 26 can be unidirectional such as MOSFETs, IGBTs or similar. Bidirectional switches can also be used at positions 25 and 26. When high voltage AC is applied at the input terminals 20 and 21, then bidirectional switches are appropriate. Respectively the unidirectional switches are more appropriate for converting DC power.

For a typical application, the drive frequency of the switches 25 and 26 would be in the 20-100 kHz frequency range although the switch frequency may go beyond this range.

The half bridge circuit has bypass capacitor 24 connected in parallel, which stabilizes the voltage short term. The switch node of the totem pole connects to the voltage blocking capacitor 27. This capacitor is a key part of the invention because it absorbs different amounts of DC (or LF AC) voltage, so the HF AC output of each module can be connected in parallel to feed a single transformer 30. In the embodiment shown on FIG. 4, the capacitor 27 is connected to the winding 31 of the transformer 30 through the common mode inductor 28 and the inductor 29. In some embodiments, one or two of these inductors may be absent.

The common load is a HF transformer 30, which may have a primary discrete inductor 29 or the inductance may be inherent as leakage inductance. A popular power conversion circuit is a resonant scheme where transformer inductance is combined with a capacitor to utilize series resonance to achieve the aforementioned low loss switching. Thus, capacitor 27 and/or capacitors 22 and 23 may function as part of this resonant circuit.

One concern about paralleling the bridge modules at the output is cross currents which are the currents that flow between modules (not to the transformer) and serve no useful purpose other than to increase power losses. The common mode inductor 28 addresses this problem. The inductor's windings 95 and 96 have little impedance for the current flowing from the half bridge to the transformer winding 31 but their impedance is high for the cross currents that flow between the nodes of the different half bridge modules. The other winding 32 of transformer 31 goes on to rectifiers or active circuits to generate the desired DC or AC output. These circuits are not shown in FIG. 4. The circuit on FIG. 4 can work in reverse, accepting power from the winding 32 or it can work bidirectionally.

Figure 5:
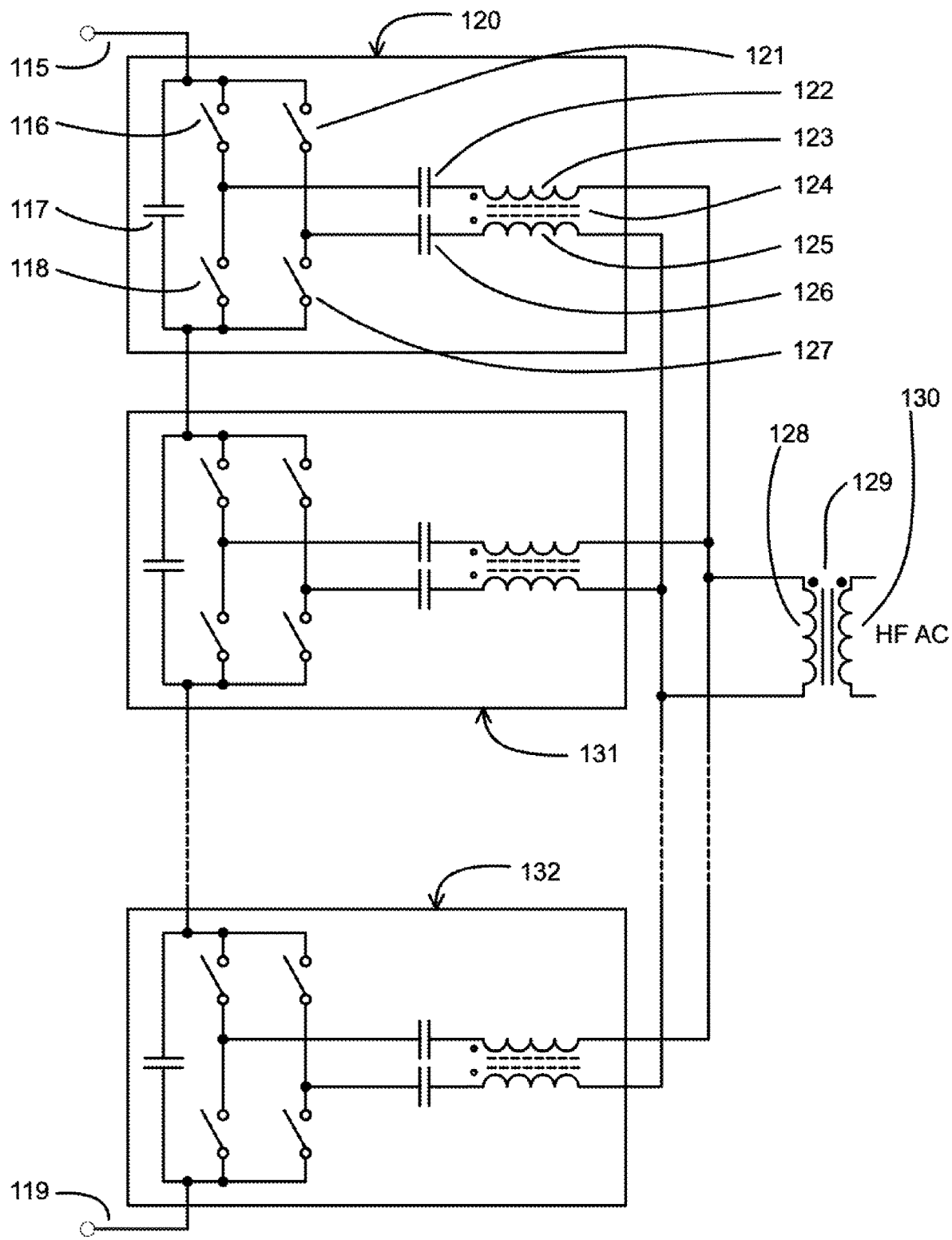
FIG. 5 is a schematic diagram of an exemplary power converter embodiment having multiple full bridge converter modules with primary sides connected in series and secondary sides connected in parallel through voltage blocking capacitors and common mode inductors.

The embodiment of FIG. 5 is similar to the one shown on FIG. 1. It shows switch bridge modules 120, 131, and 132 connected in series across the high voltage (HV) input terminals 115 and 119. The HV input can be DC or low frequency (LF) AC such as the 50/60 Hz grid (or mains) voltage from the electric utility. The dotted lines between the top two modules and the lower one indicate more series modules could be used.

Similarly to FIG. 1, FIG. 5 shows two blocking capacitors 122 and 126 placed in series with the output of each totem pole. These capacitors are connected in a way that allows all the outputs of the bridge converter modules to absorb different amounts of DC (or LF AC) voltage so the HF AC output of each module can be connected in parallel to feed a single transformer 129. Capacitors 122 and 126 block DC (or LF AC) but allow HF AC to transfer power.

The difference that distinguishes the embodiment depicted on FIG. 5 from the embodiment depicted on FIG. 1 is that each bridge converter is connected to the power transformer through a common mode inductor. On module 120 for example, the power bridge consisting of the switches 116, 118, 121 and 127 has its output going through the common mode inductor 124 to the transformer 129. Specifically, the power bridge output goes through the windings 123 and 125 of the common mode inductor 124 to get connected to the winding 128 of the transformer 129.

In general, the voltages over the bypass capacitors of the different modules may be slightly different due to the natural differences between the actual values of the components used in the different modules. These types of minor differences lead to cross currents flowing between the modules.

The address this cross current issue, in some exemplary embodiments, the common mode inductor 124 has little impedance for the current that goes from the output of the power bridge to the transformer 129. However, the windings 123 and 125 of the common mode inductor 124 place a significant impedance on the route of the cross currents between the bridge modules. In this way the cross currents are reduced.

This circuit can operate in a reverse or bidirectional way when power is applied to the winding 130 and processed to the terminals 115 and 119.

Figure 6:
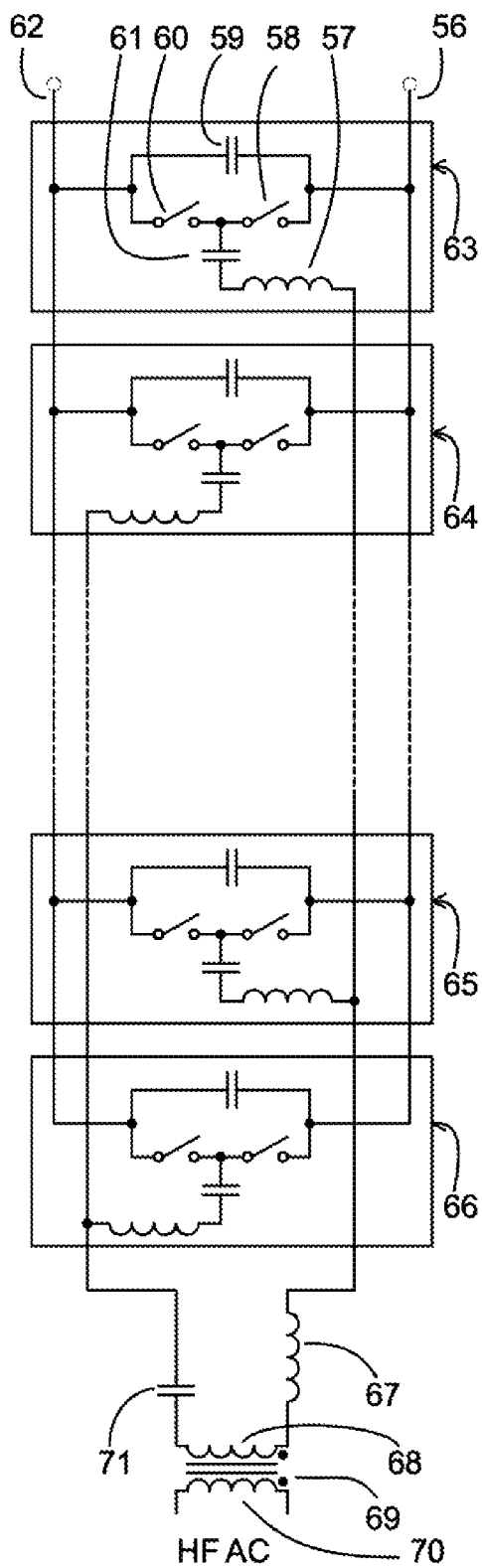
FIG. 6 is a schematic diagram of an exemplary power converter embodiment having multiple connected switch modules with primary sides connected in parallel and secondary sides connected to a single transformer winding through voltage blocking capacitors.

The embodiment of FIG. 6 shows that the switch modules can be connected in parallel for increased power. This case would apply when the input voltage across terminals 56 and 62 was low enough that switch ratings did not require series connection. Operation is identical to the series modules except that all modules see the same input voltage.

Switches 58 and 60 form one totem pole in module 63. These switches are driven at high frequency (HF) to produce a PWM waveform at the center switch node. This PWM waveform is connected to capacitor 61 and inductor 57 and then on to the transformer primary winding 68 via inductor 67. Transformer 69 is a HF transformer that provides isolation and voltage transformation for the secondary winding 70 power processing circuits (not shown). The transformer primary current returns through capacitor 71 to module 64 which operates identically to module 63 except the switches are driven 180° out of phase. Each module has a bypass capacitor such as 59 to filter ripple currents generated by the HF switching.

The pair of modules 63 and 64 form a bridge circuit. Bridges are paralleled to increase the power that can be processed; thus, modules are added in pairs. Modules 65 and 66 are an example of such a pair.

One common power conversion circuit used in this application is the resonant LLC scheme mentioned in connection with FIG. 3. Capacitor 61 and capacitors in the same positions in other parallel modules make up part of the series resonant circuit feeding transformer 69. Making these capacitors equal ensures totem pole currents will be balanced, thus sharing the total current to primary winding 68. Capacitor 71 is optional in case it is needed for the resonance circuit operation.

Inductor 57 is only needed to absorb switch drive timing differences which are typically exceedingly small (~10 nS). Most of the resonant inductance is supplied by inductor 67. It may be a discrete inductor or included in the transformer as leakage inductance.

The advantage of the embodiment of FIG. 6 is the flexibility to configure standard low-voltage converters to cover a wide power range. These are the same modules used in series for higher voltage inputs.

Figure 7:
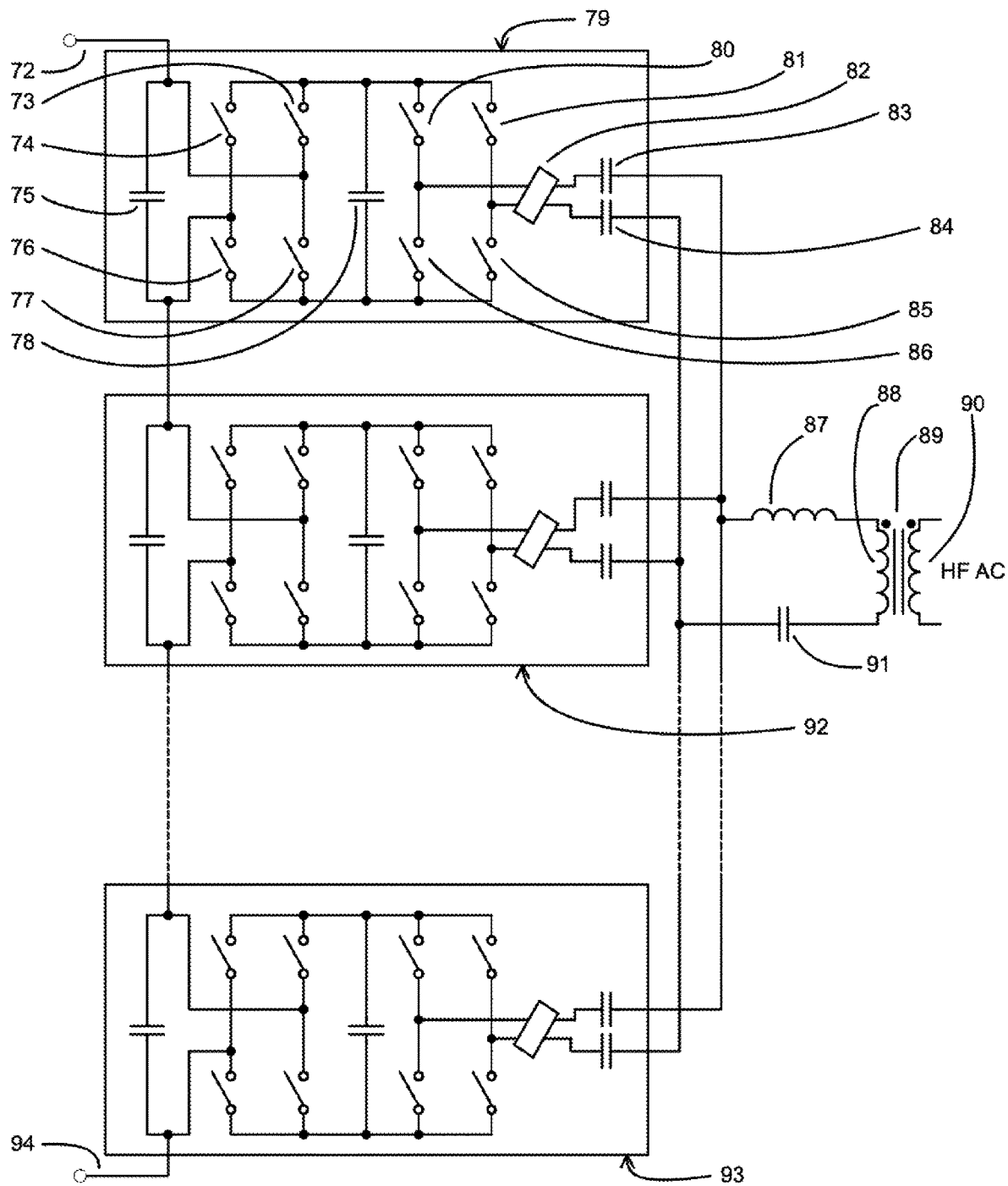
FIG. 7 is a schematic diagram of an exemplary solid state transformer embodiment based on a combination of power conversion modules with primary sides connected in series and secondary sides connected in parallel due to the use of voltage blocking capacitors.

The embodiment presented in FIG. 7 depicts the AC converter such as the one used in the high voltage side of the AC-to-AC power converter modules, commonly known as solid state transformers (SST).

In this embodiment, multiple converter modules are connected with their input sides in series and outputs in parallel. This allows them to convert a high voltage low frequency power source such as medium voltage (MV) utility power. The novelty here is that all of the converter outputs are feeding a single transformer primary winding 88 with voltage much lower than the input MV. They do this due to the use of voltage blocking capacitors such as 83 and 84 in module 79.

The embodiment in FIG. 7 shows the bypass capacitors of the power conversion modules 79, 92, 93 connected in series across high voltage (HV) input terminals 72 and 94. The HV input is AC. The dotted lines between the top two modules 79 and 92 and the lower one 93 indicate more series modules could be used.

The top module 79 will be described but the remaining modules are similar. A module consists of two full bridge converters. The one on the left side is a low frequency bridge. It is built by the switches 74, 73, 76 and 77. It rectifies the input AC voltage and creates rectified half waves over capacitor 78. Capacitor 78 stabilizes the voltage. It is a bypass capacitor for the high frequency bridge built by the switches 80, 81, 85 and 86. The high frequency bridge has its output connected to the high frequency power transformer 89 through two voltage blocking capacitors 83 and 84. These capacitors are a key part of the invention because they absorb different amounts of DC (or low frequency AC) voltage so the high frequency AC output of each module can be connected in parallel to feed a single transformer 89. Capacitors 83 and 84 block DC (or LF AC) but allow HF AC to transfer power.

The capacitor 91 as well as the inductor 87 are presented in FIG. 7 to illustrate resonant operation, although their presence is optional.

The circuit presented on FIG. 7 utilizes unidirectional switches in most cases. The LF bridge switches with the AC line frequency which in most cases is 50 or 60 Hz. The HF bridge drive would be in the 20-100 kHz frequency range although the switch frequency in some cases may be above or below this range.

The minor differences in the switch times as well as the differences in components values and the voltages across some capacitors can lead to cross currents flowing between the HF bridges. In this embodiment ferrite beads are being placed between the output of each high frequency bridge and the transformer 89 primary winding 88. The bead in the module 79 is marked as 82. It will be evident to anyone skilled in the art that a common mode inductor, or regular inductors may be used in the same position for the same purpose.

The other winding 90 of transformer 89 goes on to rectifiers or active circuits to generate the desired DC or AC output. In case the embodiment from FIG. 7 serves as a high voltage converter of a SST, then the circuit connected to the winding 90 can be a mirror image of module 79 with or without the ferrite bead 82 and the capacitors 83 and 84.

This circuit is bidirectional and allows the power to be processed either way, from the terminals 72 and 94 to the transformer 89 or from the transformer 89 to the terminals 72 and 94.

Figure 8:
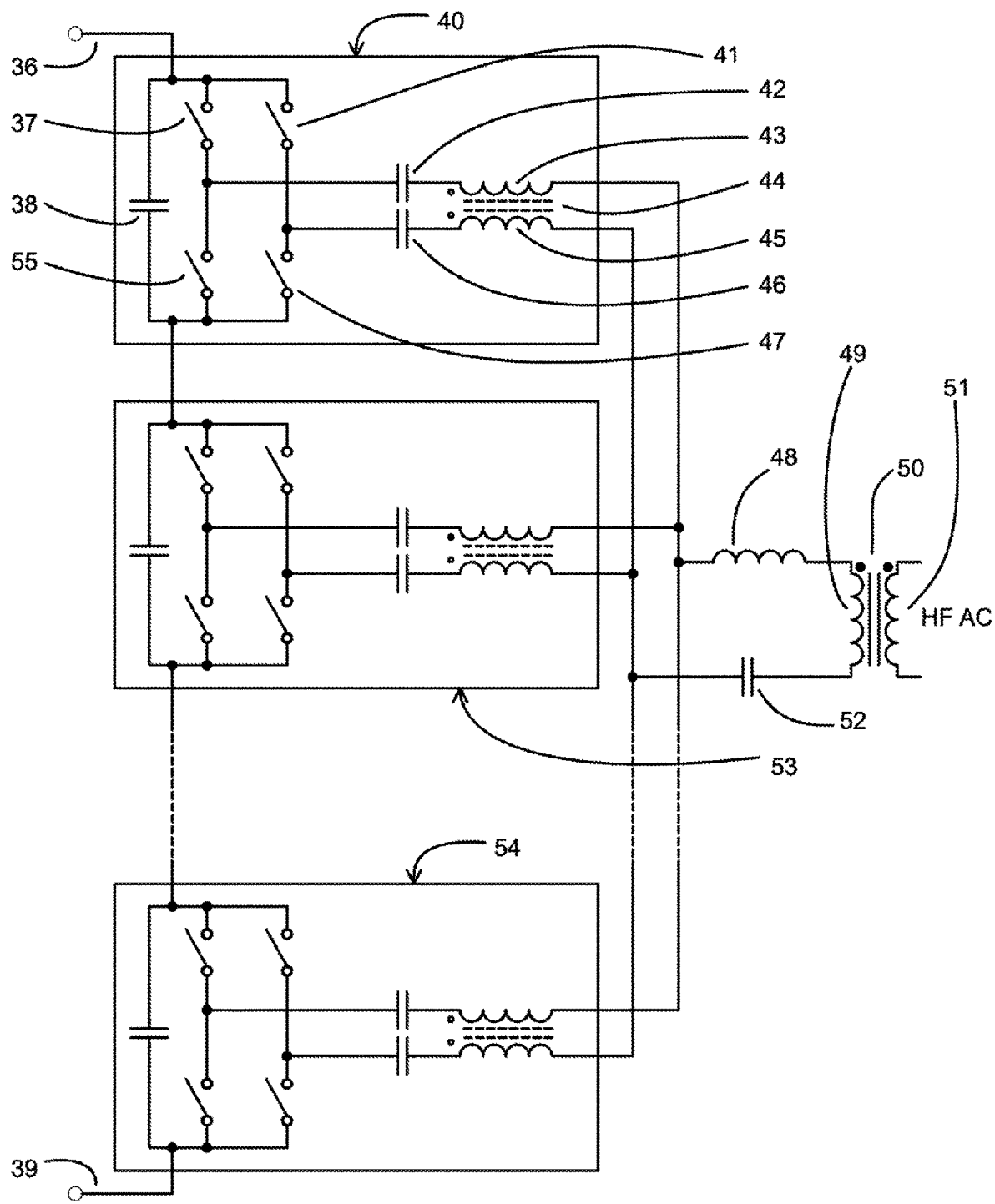
FIG. 8 is a schematic diagram of the exemplary power converter embodiment depicted in connection with FIG. 5 with a further resonant converter circuit.

The embodiment of FIG. 8 is similar to the one shown on FIG. 3. It shows switch bridge modules 40, 53 and 54 connected in series across the high voltage (HV) input terminals 36 and 39. The HV input can be DC or low frequency (LF) AC such as the 50/60 Hz grid (or mains) voltage from the electric utility. The dotted lines between the top two modules and the lower one indicate more series modules could be used.

Similarly to FIG. 3, FIG. 8 shows two blocking capacitors 42 and 46 placed in series with the output of each totem pole. These capacitors are connected in a way that allows all the outputs of the bridge converter modules to absorb different amounts of DC (or LF AC) voltage so the HF AC output of each module can be connected in parallel to feed a single transformer 50. Capacitors 42 and 46 block DC (or LF AC) but allow HF AC to transfer power.

The difference that distinguishes the embodiment depicted on FIG. 8 from the embodiment depicted on FIG. 3 is that each bridge converter is connected to the power transformer through a common mode inductor. On module 40 for example, the power bridge consisting of the switches 37, 55, 41 and 47 has its output going through the common mode inductor 44 to the transformer 50. Specifically, the power bridge output goes through the windings 43 and 45 of the common mode inductor 44 to get connected to the winding 49 of the transformer 50. The embodiment depicted in connection with FIG. 8 specifically shows resonant inductor 48 and capacitor 52 between all the common mode inductors and the primary winding 49 of the transformer 50.

In general, the voltages over the bypass capacitors of the different modules may be slightly different due to the natural differences between the actual values of the components used in the different modules. These types of minor differences lead to cross currents flowing between the modules.

The common mode inductor 44 has little impedance for the current that goes from the output of the power bridge to the transformer 50. However, the windings 43 and 45 of the common mode inductor 44 place a significant impedance on the route of the cross currents between the bridge modules. In this way the cross currents are reduced.

This circuit can operate in a reverse or bidirectional way when power is applied to the winding 51 and processed to the terminals 36 and 39.

Figure 9:
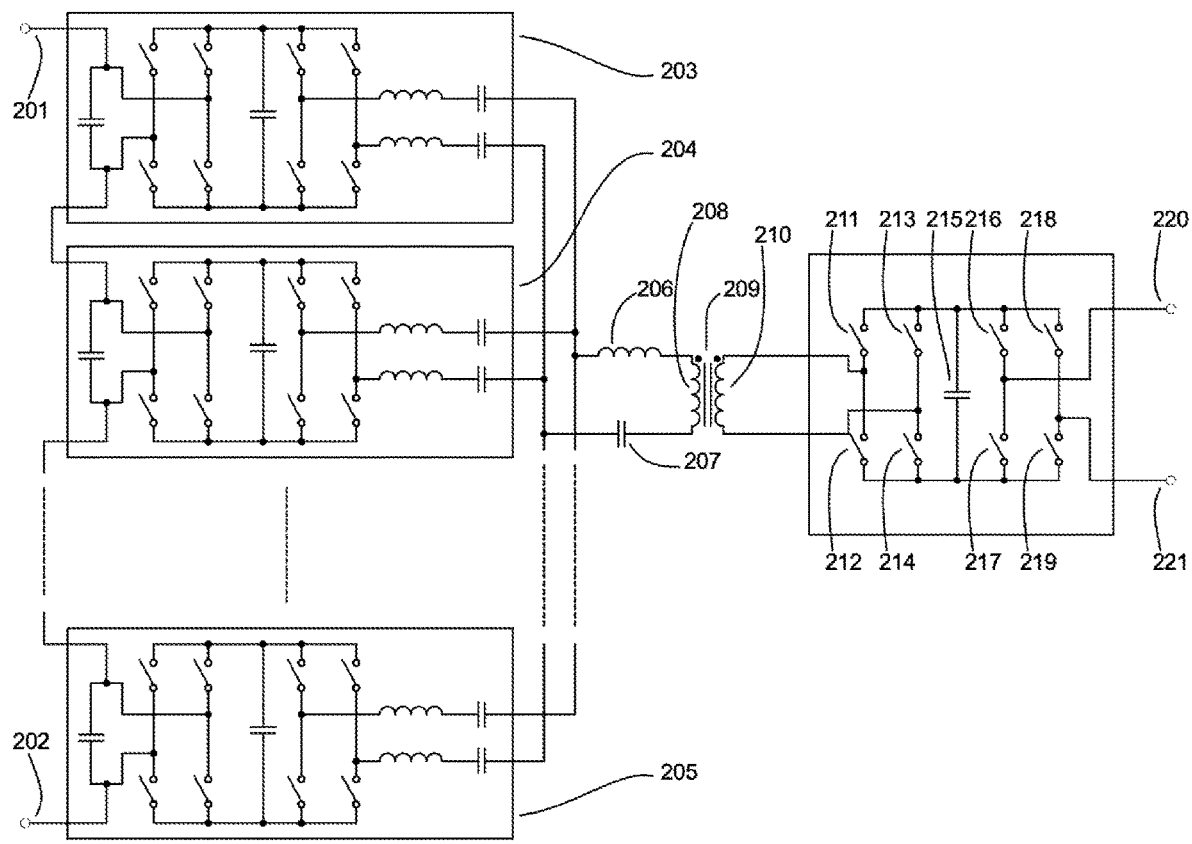
FIG. 9 is a schematic diagram of an exemplary power converter embodiment for single-phase AC/AC SST.

FIG. 9 is a schematic diagram of an exemplary power converter embodiment for a single-phase AC/AC SST. It consists of multiple full bridge primary switch modules with primary sides connected in series and secondary sides connected in parallel through voltage offset capacitors. In this embodiment, unidirectional switches as MOSFETs or IGBTs are utilized to convert a HV or MV power source, which can be either AC or DC. Bidirectional switches may be optionally used as well. The low voltage side in this specific embodiment is AC.

The embodiment of FIG. 9 shows power modules, or primary switch modules, 203, 204, 205 connected in series across high voltage (HV) input terminals 201 and 202, thus building a HV or MV power converter based on modules parallel driving the transformer primary. The HV input can be DC or low frequency (LF) AC such as the 50/60 Hz grid (or mains) voltage from the electric utility. The dotted lines between the top two modules and the lower one indicate that more series modules could be used.

The embodiments of the primary switch modules used in the exemplary circuit shown in connection with FIG. 9 are presented and described in further detail in connection with FIG. 12. It will be evident to anyone skilled in the art that the modules described in connection with FIG. 11 can also be used in this circuit.

The primary switch modules 203, 204 . . . 205 have their inputs connected in series and their outputs connected in parallel through the voltage blocking capacitors inside each of the modules. The common output of all the modules is then applied to a primary winding 208 of a high or medium frequency transformer 209 through a resonant tank consisting out of the inductor 206 and the capacitor 207.

On the other side of the high frequency power transformer an exemplary secondary switch module is illustrated as a full bridge rectifying circuit build with the switches 211, 212, 213 and 214. The secondary switch module is rectifying the voltage of the secondary winding 210 of the transformer 209 and applying it to the bypass capacitor 215. The four switches 211, 212, 213 and 214 can be implemented but are not limited to semiconductors such as IGBTs, or MOSFETs. It will be evident to everyone skillful at the art that half bridge circuit embodiments can be optionally used instead of a full bridge rectifier. The second full bridge 216, 217, 218 and 219 is unfolding the voltage of the capacitor 215 this way providing at the output terminals 220 and 221 a replica of the voltage coming to the input terminals 201 and 202.

Due to the naturally bidirectional operation of the circuit, the output terminals 220 and 221—can be used as an input and the input terminals 201 and 202 can be the output in case of reverse operation of the exemplary circuit shown in this FIG. 9.

Figure 10:
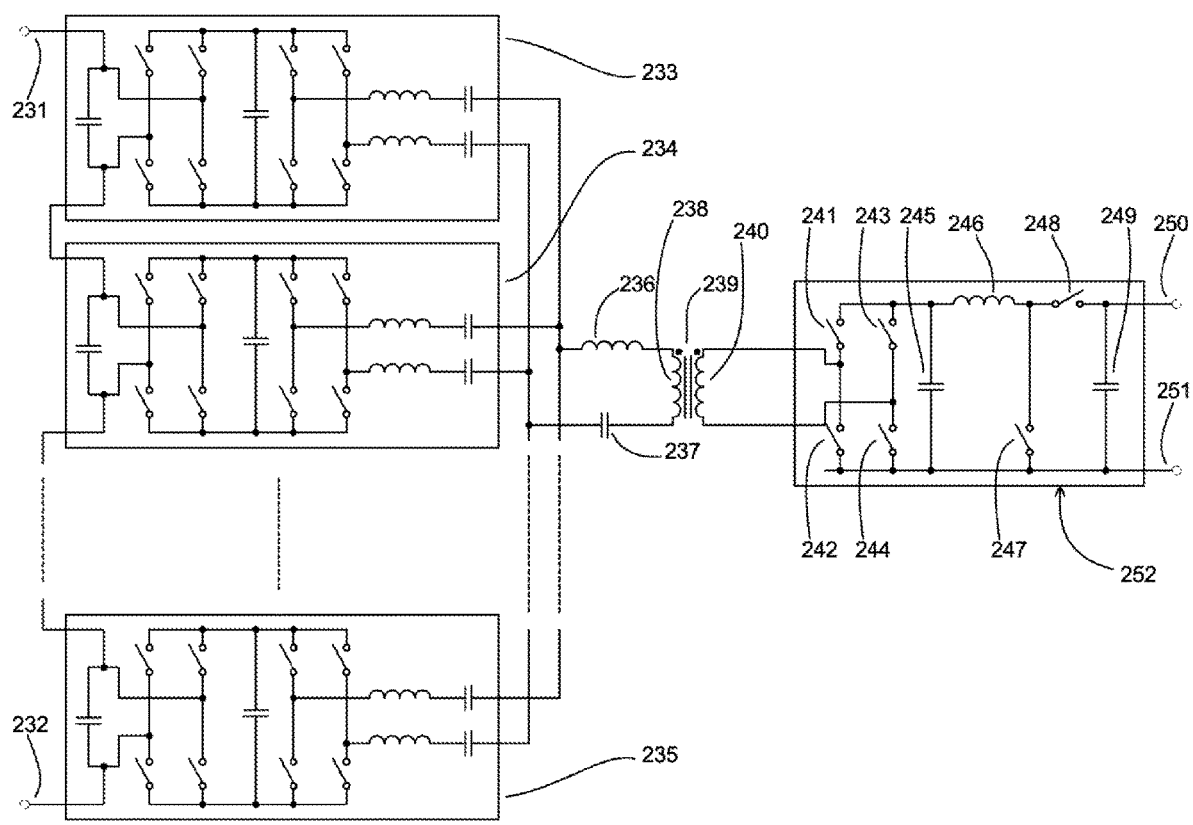
FIG. 10 is a schematic diagram of an exemplary power converter embodiment for single-phase AC/DC SST.

FIG. 10 is a schematic diagram of an exemplary power converter embodiment for a single-phase AC/DC SST. It consists of multiple full bridge primary switch modules with primary sides connected in series and secondary sides connected in parallel through voltage offset capacitors. In this embodiment unidirectional switches as MOSFETs or IGBTs are utilized to convert a HV or MV power source, which can be either AC or DC. Bidirectional switches may be optionally used as well. The low side voltage in this specific embodiment is DC.

The embodiment illustrated in connection with FIG. 10 shows an AC/DC power converter based on modules parallel driving the transformer primary. The HV side of the transformer 239 is the same as the one shown in connection with FIG. 9. The LV side in this embodiment is shown with a boost converter exemplified by the switches 247 and 248, the inductor 246 and the capacitor 249. This boost circuit produces DC output of the converter and improves the power factor of the AC output. It will be evident to everyone skilled in the art that the switch 248 in some cases may be substituted by a diode if bidirectional operation is not needed.

The embodiments of the primary switch modules 233, 234 and 235 used in the exemplary circuit shown in connection with FIG. 10 are presented and described in further detail in connection with FIG. 12. It will be evident to anyone skilled in the art that the modules described in connection with FIG. 11 can also be used in this circuit.

Figure 11:
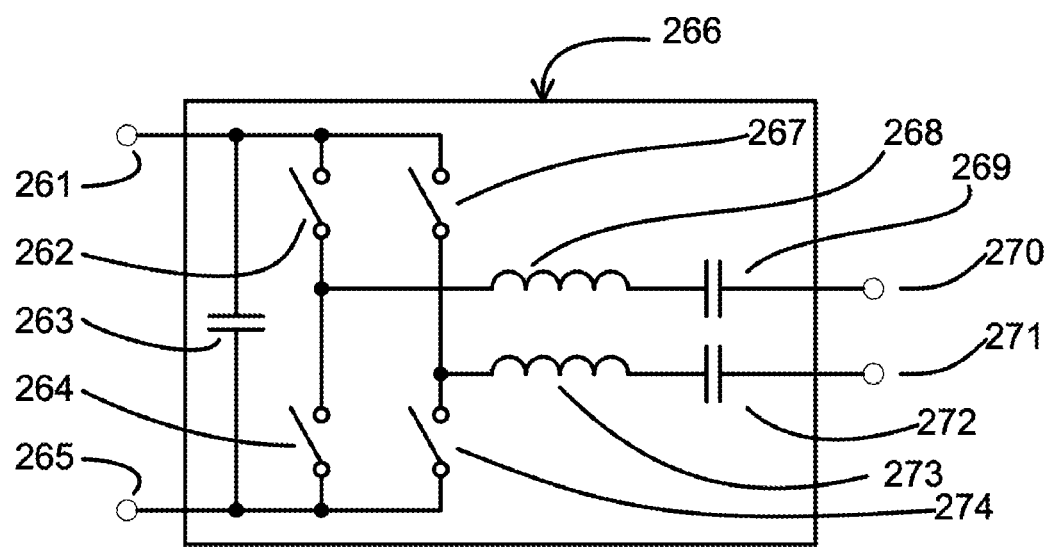
FIG. 11 is a schematic diagram of an exemplary power converter switch module embodiment utilizing four switches.

FIG. 11 is a schematic diagram of an exemplary power converter primary switch module embodiment utilizing four bidirectional or unidirectional switches. This module can convert AC or DC if bidirectional switches are used, while converting either DC in case of unidirectional switches being used. The inductors utilized in the module can be either two of differential mode or a single common mode inductor.

The embodiment of FIG. 11 shows a primary switch module which can be used as a building block of a power converter based on modules parallel driving the transformer primary. The input voltage is being applied to the terminals 261 and 265 and then it is processed by a full bridge build by 262, 264, 267 and 274. The four switches 262, 264, 267 and 274, can be implemented but are not limited to semiconductors such as IGBTs, or MOSFETs. The output of the full bridge goes through the inductors 268 and 273 which can be either separate differential mode inductors or a single common mode inductor. After the inductor, the capacitors 269 and 272 are serving the purpose of creating a voltage shift thus allowing multiple modules to get their outputs connected in parallel, regardless as to whether the modules inputs are connected to different voltage potentials. Bypass capacitor 263 is optionally provided to provide voltage stabilization.

In some cases the capacitors 269 and 272 have a second function to create a resonance tank with the inductors 268 and 273 and the rest of the inductance at the output of the module 270 and 271. Due to the naturally bidirectional operation of the module 266, the output terminals 270 and 271 can be used as an input and the input terminals 261 and 265 can be the output in case of reverse operation of circuits constructed using exemplary primary switch modules as shown in connection with FIG. 11.

Figure 12:
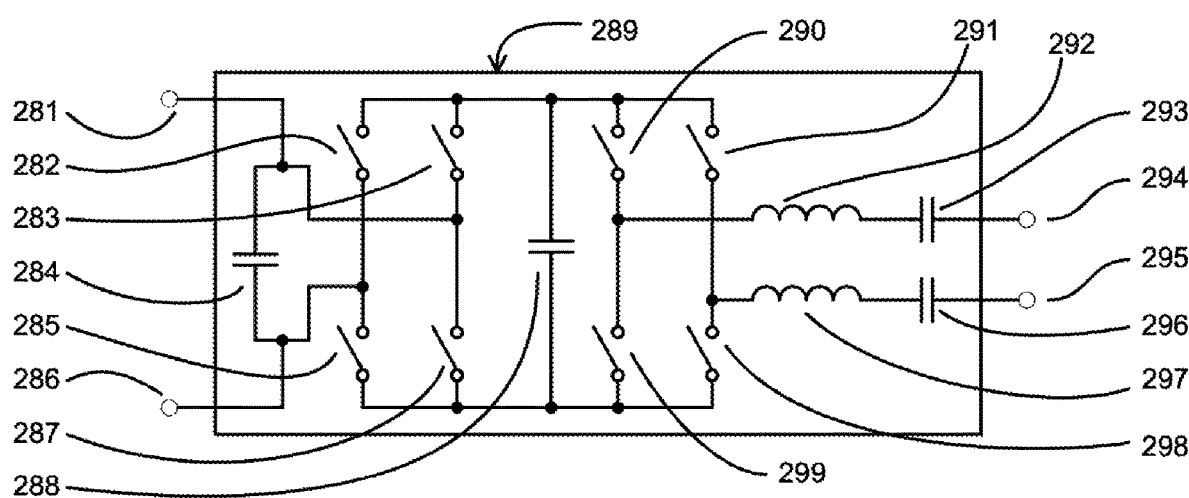
FIG. 12 is a schematic diagram of an exemplary power converter switch module embodiment utilizing eight switches.

FIG. 12 is a schematic diagram of an exemplary power converter primary switch module embodiment utilizing eight switches. This exemplary module can convert either AC or DC utilizing unidirectional switches as well as bidirectional switches. The inductors utilized in the module can be either two of differential mode, or a common mode inductor.

The embodiment illustrated in connection with FIG. 12 shows a primary switch module which can be used as a building block of a power converter based on modules parallel driving the transformer primary. The input voltage is being applied to the terminals 281 and 286 and then it is processed by a full bridge build by 282, 285, 283 and 287. The four switches 282, 285, 283 and 287 can be implemented but are not limited to semiconductors such as IGBTs, or MOSFETs. The output of the full bridge is filtered by the capacitor 288 and then applied to another full bridge built by 290, 299, 291 and 298. It then goes through the inductors 292 and 297 and the capacitors 293 and 296 to the output of the module 294 and 295. The inductors 292 and 297 can be separate differential inductors, although in some cases a single common mode inductor can be substituted for both.

The capacitors 293 and 296 are serving the purpose of creating a voltage shift thus allowing multiple modules to get their outputs connected in parallel, no matter that in reality the modules inputs are connected to different voltage potentials. In some cases, the capacitors 293 and 296 have a second function, to create a resonance tank with the inductors 292 and 297 and the rest of the inductance at the output of the module 294 and 295. Due to the naturally bidirectional operation of the module 289, the output terminals 294 and 295 can be used as an input and the input terminals 281 and 286 can be the output in case of reverse operation of the module 289.

Primary switch modules of the type shown at 289 in FIG. 12 as well as the module 266 from FIG. 11 can both be used as building blocks of power converters with primary switch modules parallel driving transformer primary. Module 289 allows low frequency AC to be processed even if unidirectional switches such as MOSFETs or IGBTs are being used, while module 266 from FIG. 11 can process DC if implemented with unidirectional switches while it still be capable of processing AC if it is built with bidirectional switches.

Figure 13:
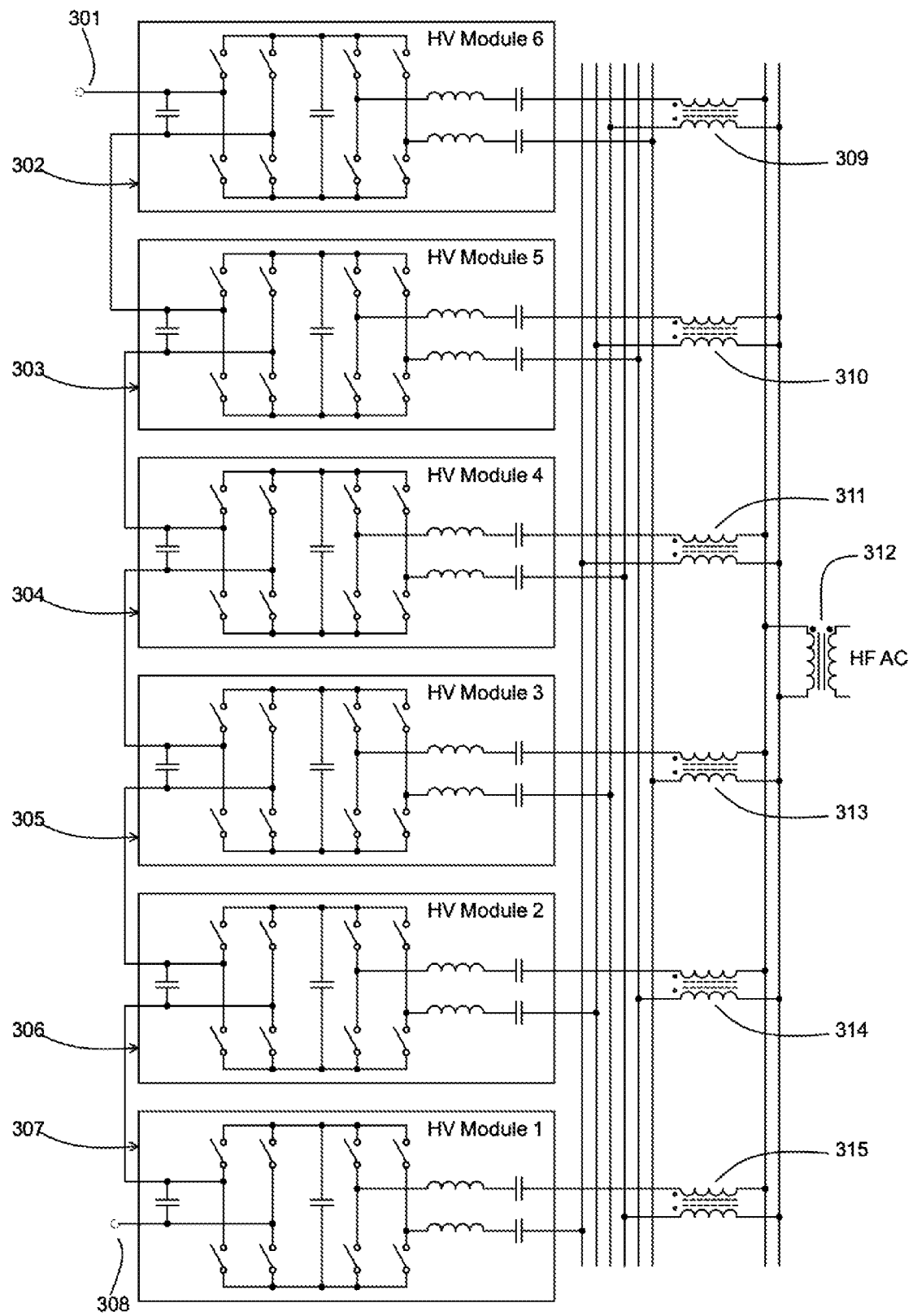
FIG. 13 is a schematic diagram of an exemplary power converter embodiment having six switch modules and common mode inductors.

FIG. 13 is a schematic diagram of an exemplary power converter embodiment having six switch modules and common mode inductors. It will be evident for everyone skilled in the art that the number of power modules depends on the magnitude of the voltage on the MV or HV side and on the voltage rating of the switches used in the power modules. It illustrates a solution to a potential problem with voltage or current imbalance by implementing common mode inductors which equalize the currents coming out of different totem poles.

This exemplary embodiment shows six primary switch modules 302, 303, 304, 305, 306 and 307 connected in series across HV input terminals 301 and 308, thus building a HV or MV power converter based on modules parallel driving the transformer primary. The HV input can be DC or low frequency (LF) AC such as the 50/60 Hz grid (or mains) voltage from the electric utility. The dotted lines between the top two modules and the lower one indicate that more series modules could be used.

The embodiments of the primary switch modules 302, 303, 304, 305, 306 and 307 used in the exemplary circuit shown in connection with FIG. 13 are presented and described in further detail in connection with FIG. 12. It will be evident to anyone skilled in the art that the modules described in connection with FIG. 11 can also be used in this circuit.

The HV modules 302, 303, 304, 305, 306 and 307 have their inputs connected in series and their outputs connected in parallel through the voltage blocking capacitors inside each of the modules. The common output of all of the modules is then applied to a primary winding of the transformer 312 through a number of common mode inductors 309, 310, 311, 313, 314 and 315. The purpose of the common mode inductors is to equalize the currents flowing through the primary switch modules. To do this, the common mode inductors are connected in a way that in case of a balanced operation, the windings take equal currents flowing in the opposite direction, so the resulting magnetic field is zero. However, if unbalanced modules are trying to force currents that are not equal, then the inductance is being applied to prevent the imbalance from increasing. In case of the exemplary six-module solid state transformer such as the one shown in connection with FIG. 13, and in this specific implementation, the inductors 309, 310, 311, 313, 314 and 315 equalize the current coming out of HV Module 1 with HV Module 4, while the current coming out of HV Module 2 is being equalized with the current from HV Module 5, and also the current coming out of HV Module 3 is being equalized with the current from HV Module 6. All left sides of the common mode inductors 309, 310, 311, 313, 314 and 315 are connected in parallel to the winding of the transformer 312. Due to the naturally bidirectional operation of the circuit, the transformer 312 can transfer power from its HF AC side to the terminals 301 and 308 which serve the purpose of output terminals in this case.

Figure 14:
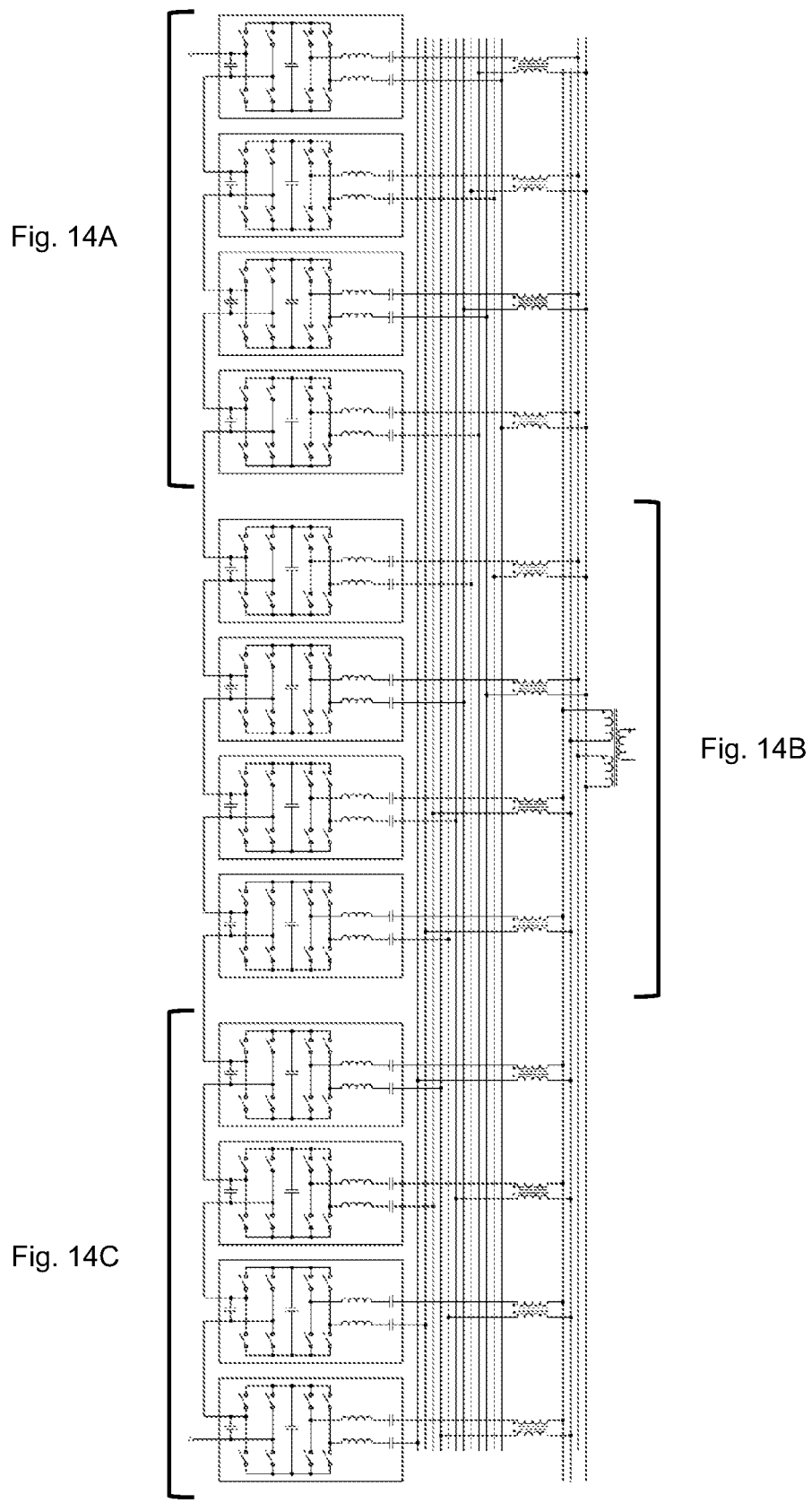
FIG. 14 is a schematic diagram of an exemplary power converter embodiment having twelve switch modules, common mode inductors and a plurality of primary transformer windings.
Figure 14A:
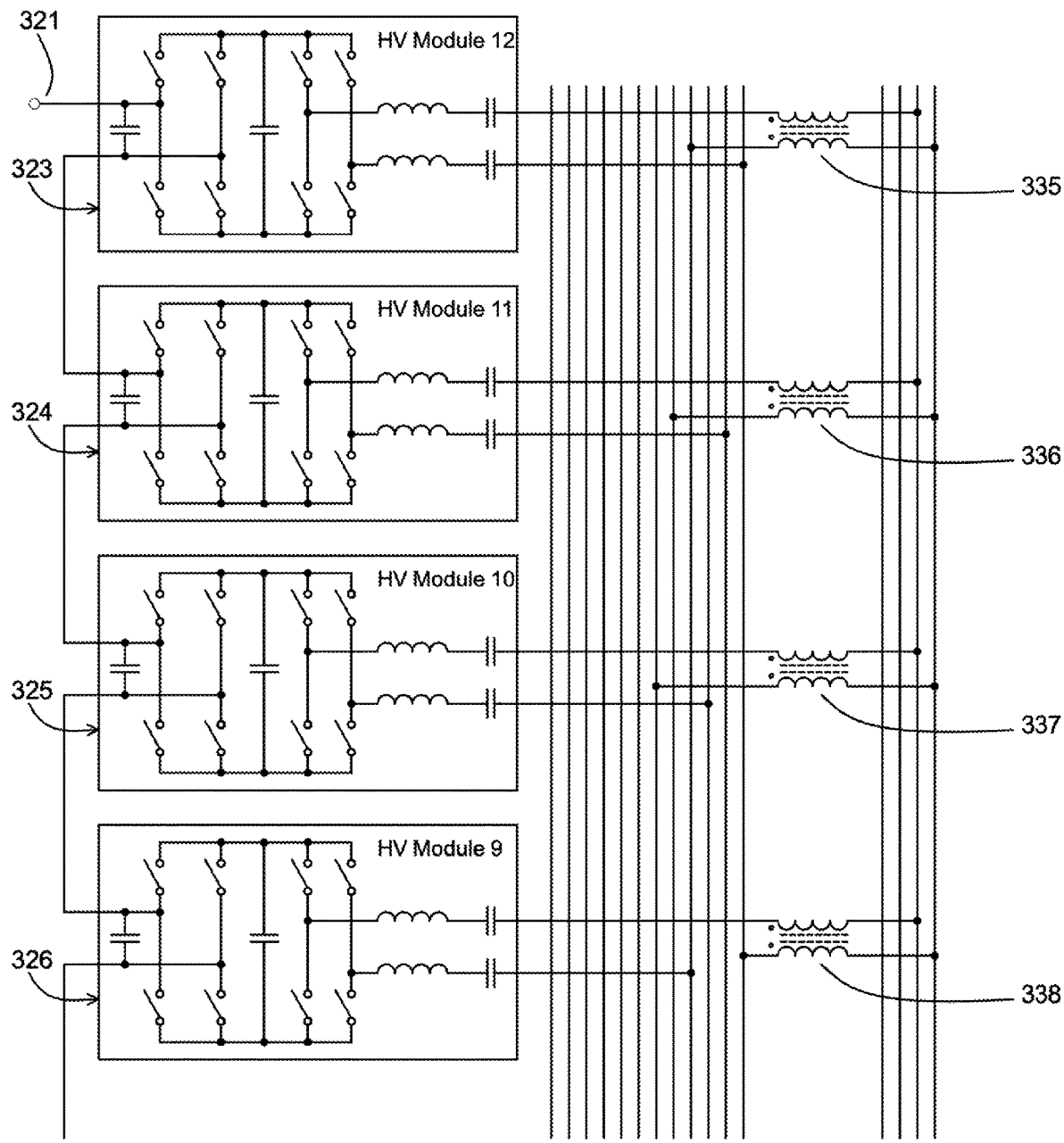
FIG. 14A is a first partial view of the schematic diagram as indicated in FIG. 14.
Figure 14B:
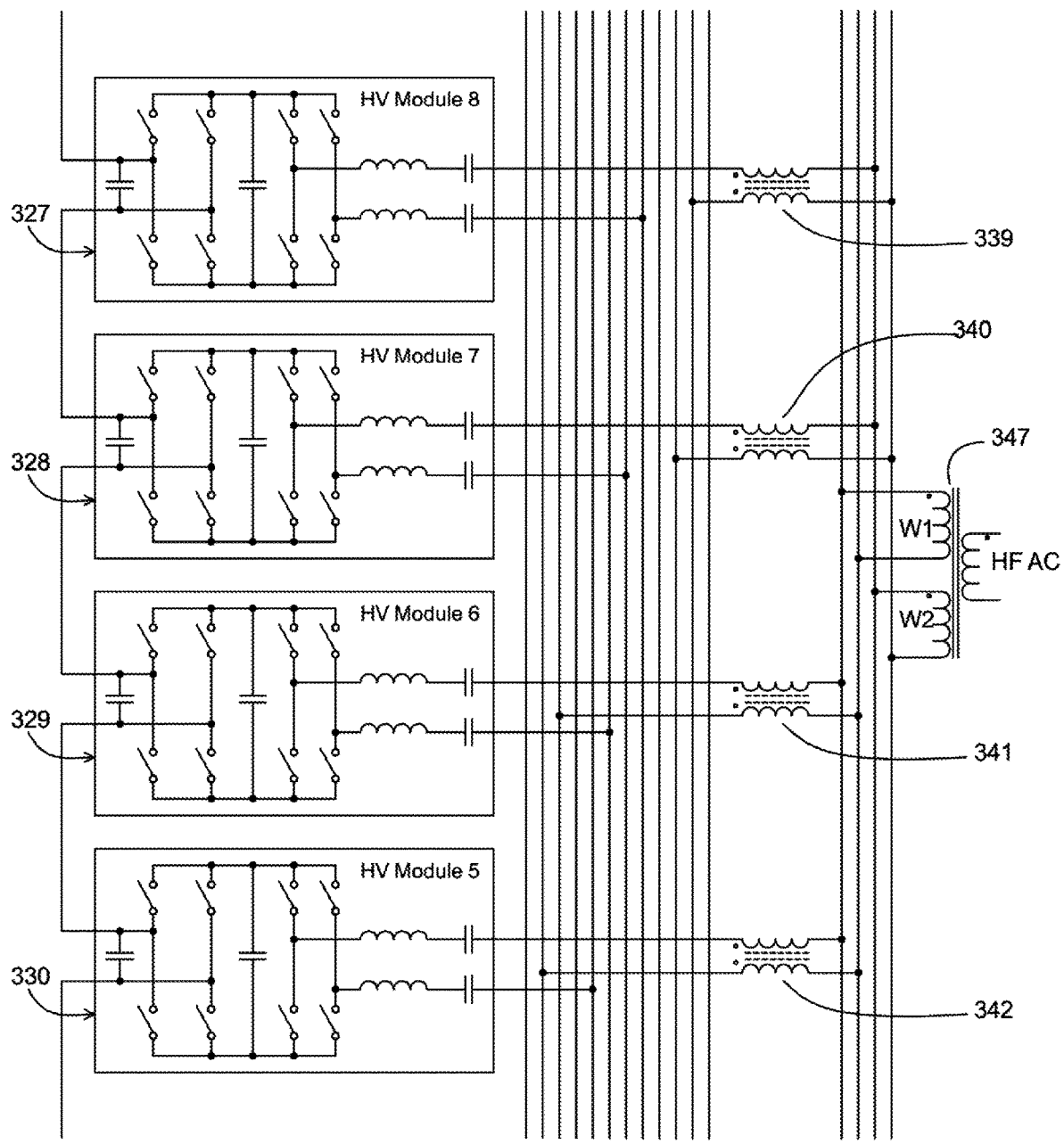
FIG. 14B is a second partial view of the schematic diagram as indicated in FIG. 14.
Figure 14C:
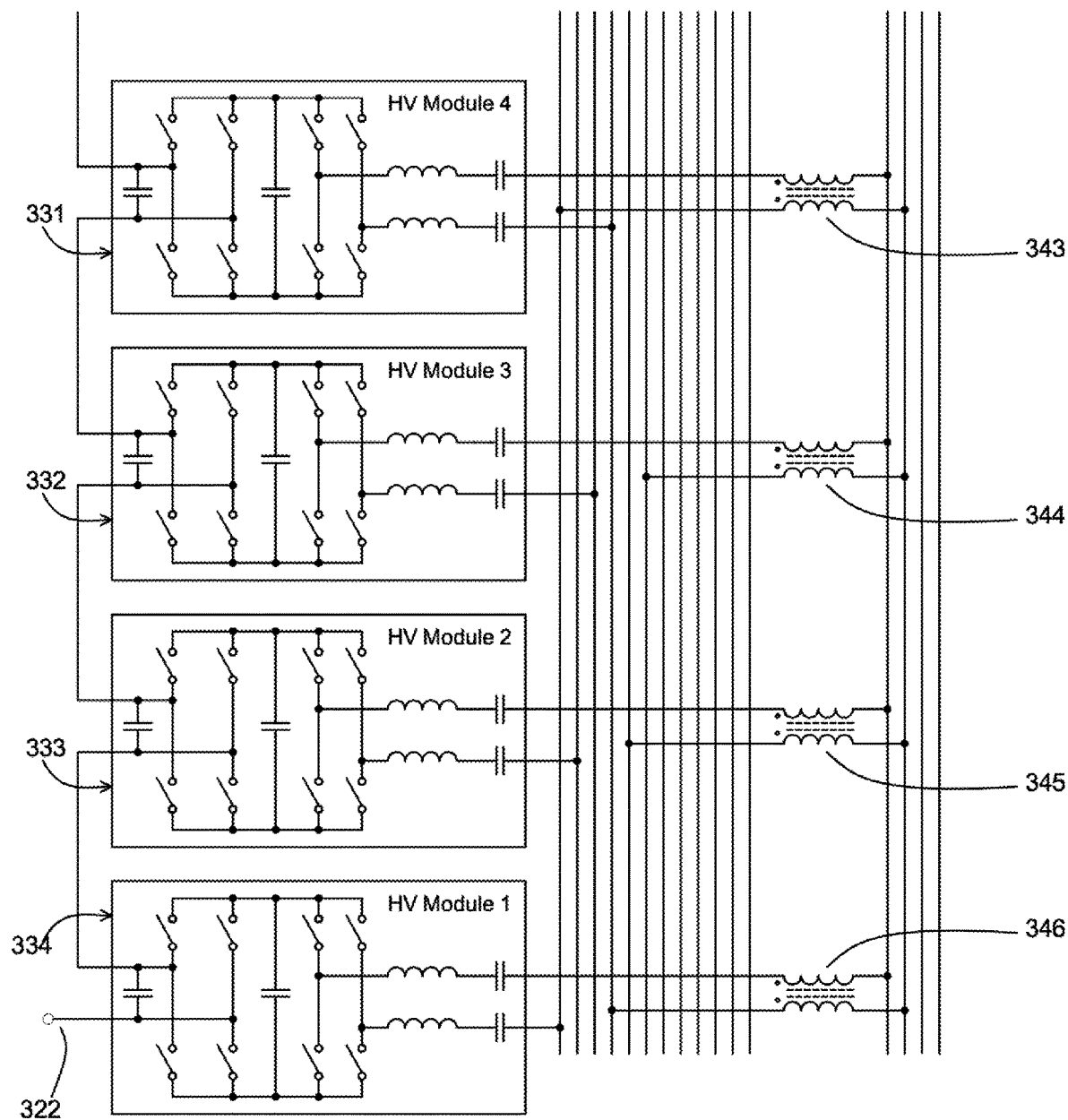
FIG. 14C is a third partial view of the schematic diagram as indicated in FIG. 14.

FIG. 14 is a schematic diagram of an exemplary power converter embodiment having twelve switch modules, common mode inductors and a plurality of primary transformer windings. This embodiment shows an exemplary HV or MV power converter based on a higher number of primary switch modules parallel driving the transformer primary. In some cases, if the number of power modules with inputs in series and outputs connected in parallel is large, then multiple winding transformers can be used.

In the embodiment presented in connection with FIG. 14, the power transformer 347 has two primary windings on its high voltage side, each one of the windings accommodating the outputs of six primary switch modules. In this embodiment the bottom or first primary winding accommodates the outputs of modules 323, 324, 325, 326, 327 and 328, while the top or second primary winding accommodates the outputs of the power modules 329, 330, 331, 332, 333 and 334. In this manner the number of modules parallel driving the transformer primary is limited to six per each winding. The HV input can be DC or LF AC such as the 50/60 Hz grid (or mains) voltage from the electric utility. The dotted lines between the top two modules and the lower one indicate that more series modules could be used.

The embodiments of the primary switch modules used in the exemplary circuit shown in connection with FIG. 14 are presented and described in further detail in connection with FIG. 12. It will be evident to anyone skilled in the art that the modules described in connection with FIG. 11 can also be used in this circuit.

In this embodiment several common mode inductors are again used to equalize the currents produced by each of the power module. The outputs of different primary switch modules producing currents with opposite direction are going through common mode inductors in order for these inductors to force the modules to produce currents with equal magnitude.

In this specific embodiment a power transformer with two HV-side primary windings is utilized. The embodiment shown in connection with this FIG. 14 illustrates a solution of a potential problem with voltage or current imbalance by implementing common mode inductors which equalize the currents coming out of different totem poles. In this specific embodiment the current coming out of HV Module 1 is equalized with the current from HV Module 4, while the current coming out of HV Module 2 is equalized with the current from HV Module 5, and also the current coming out of HV Module 3 is equalized with the current from HV Module 6. Respectively in the modules connected with the top side transformer winding, the current coming out of HV Module 7 is equalized with the current from HV Module 10, while the current coming out of HV Module 8 is equalized with the current from HV Module 11, and also the current coming out of HV Module 9 is equalized with the current from HV Module 12.

The common outputs of the common mode inductors are then applied to the transformer windings as described above. Due to the naturally bidirectional operation of the circuit, the transformer 347 can transfer power from its HF AC side to the terminals 321 and 322 which serve the purpose of output terminals in this case.

Figure 15A:
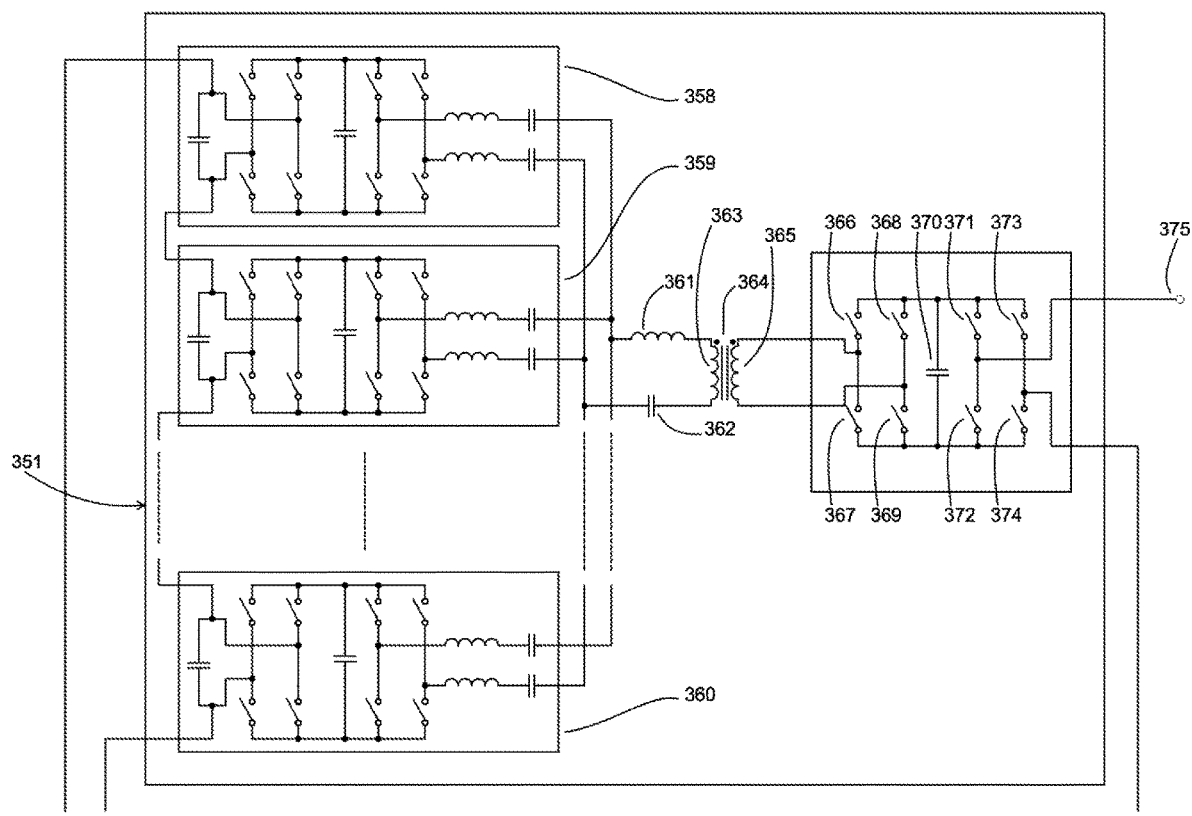
FIG. 15A is a first partial view of the schematic diagram as indicated in FIG. 15.
Figure 15B:
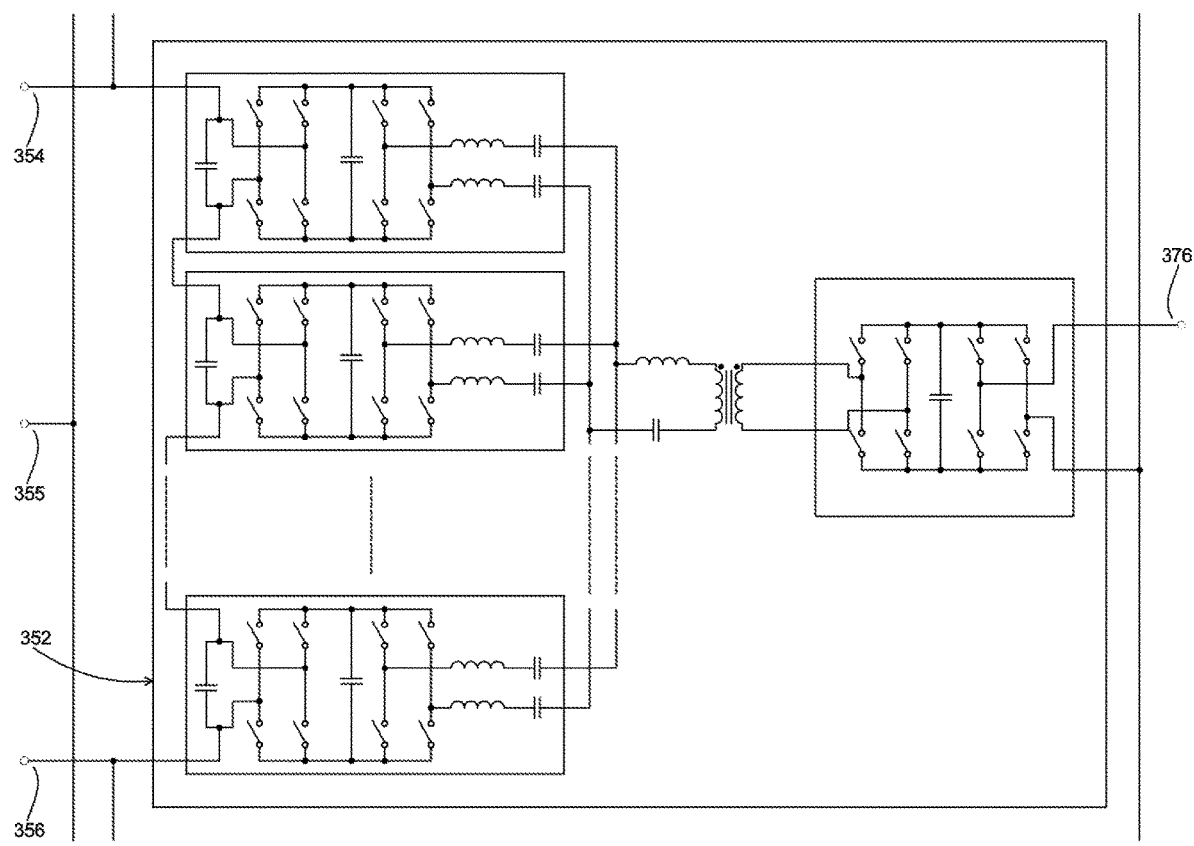
FIG. 15B is a second partial view of the schematic diagram as indicated in FIG. 15.
Figure 15C:
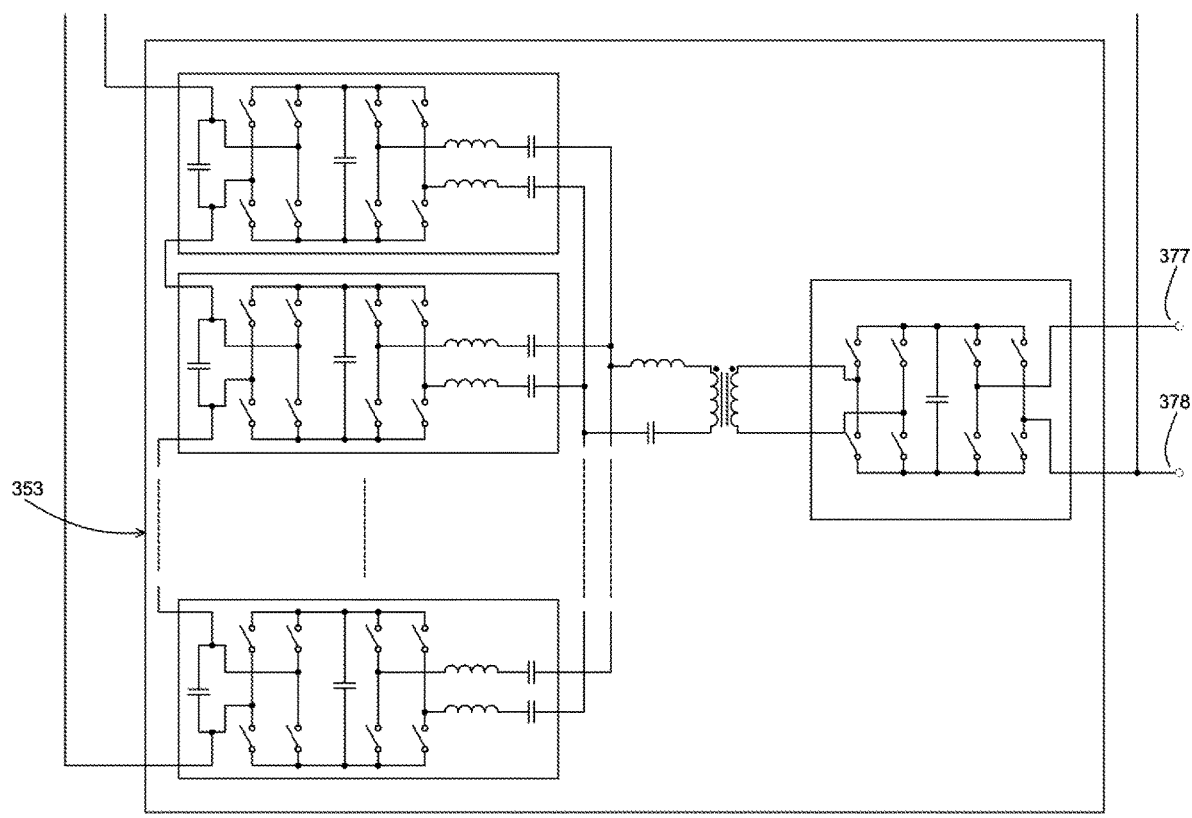
FIG. 15C is a third partial view of the schematic diagram as indicated in FIG. 15.

FIG. 15 is a schematic diagram of an exemplary power converter embodiment for three-phase AC/AC SST. This embodiment presents an exemplary three-phase AC to AC MV or HV converter based on HV converters with primary switch modules parallel driving transformer primary. When three-phase SST is needed, then the converters 351, 352 and 353 can be connected in a delta to wye converter arrangement as shown in the FIG. 15. It will be evident to everyone skilled in the art that wye to wye, wye to delta, and delta to delta arrangements are also possible ways to utilize the disclosed technology of HV converters with primary switch modules parallel driving transformer primary for three-phase applications. The exemplary circuit depicted in connection with FIG. 15 is naturally bidirectional. The technology is suitable to be applied in other converter topologies where multi-phase power source or multiphase load is needed.

Figure 16:
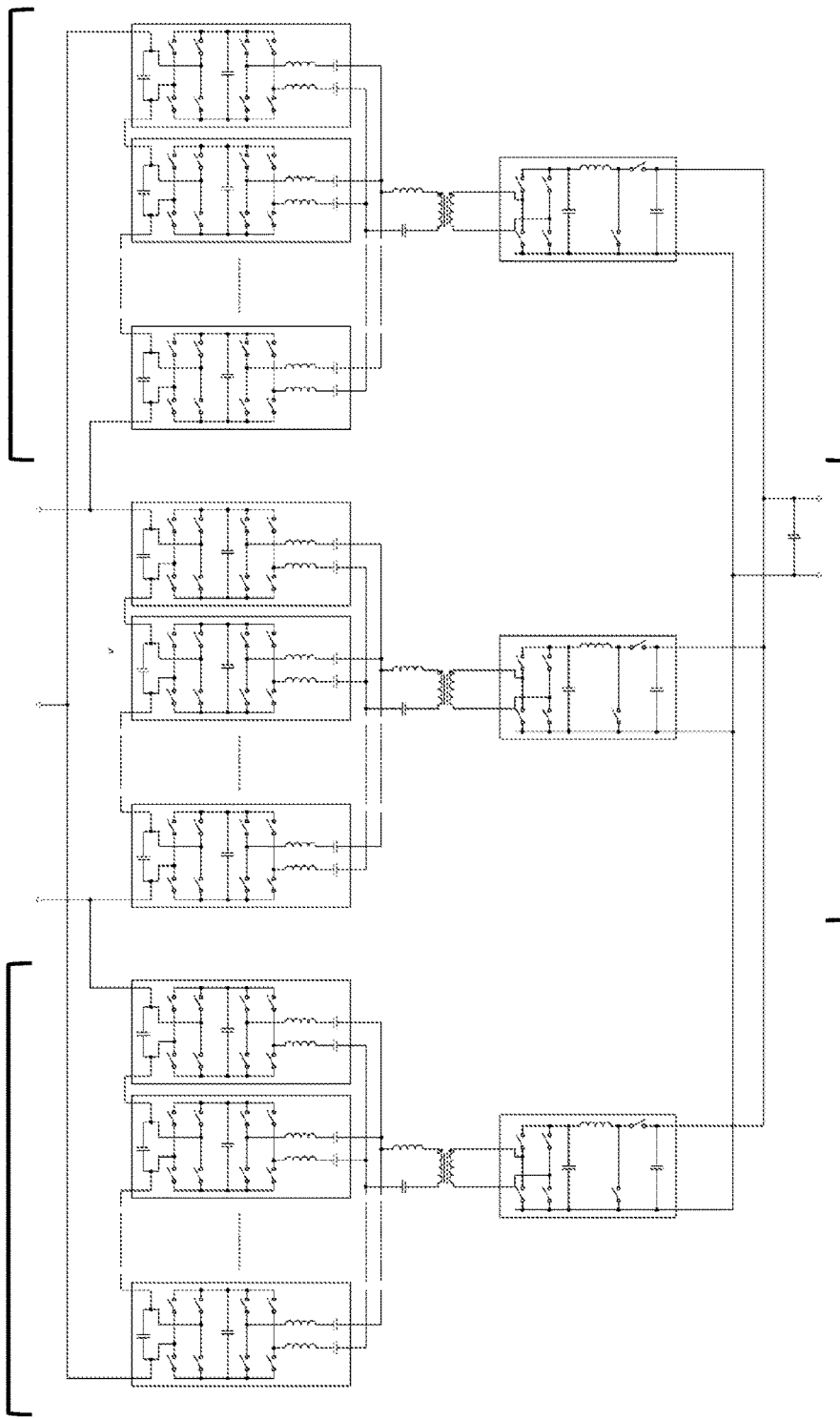
FIG. 16 is a schematic diagram of an exemplary power converter embodiment for three-phase AC/DC SST.
Figure 16A:
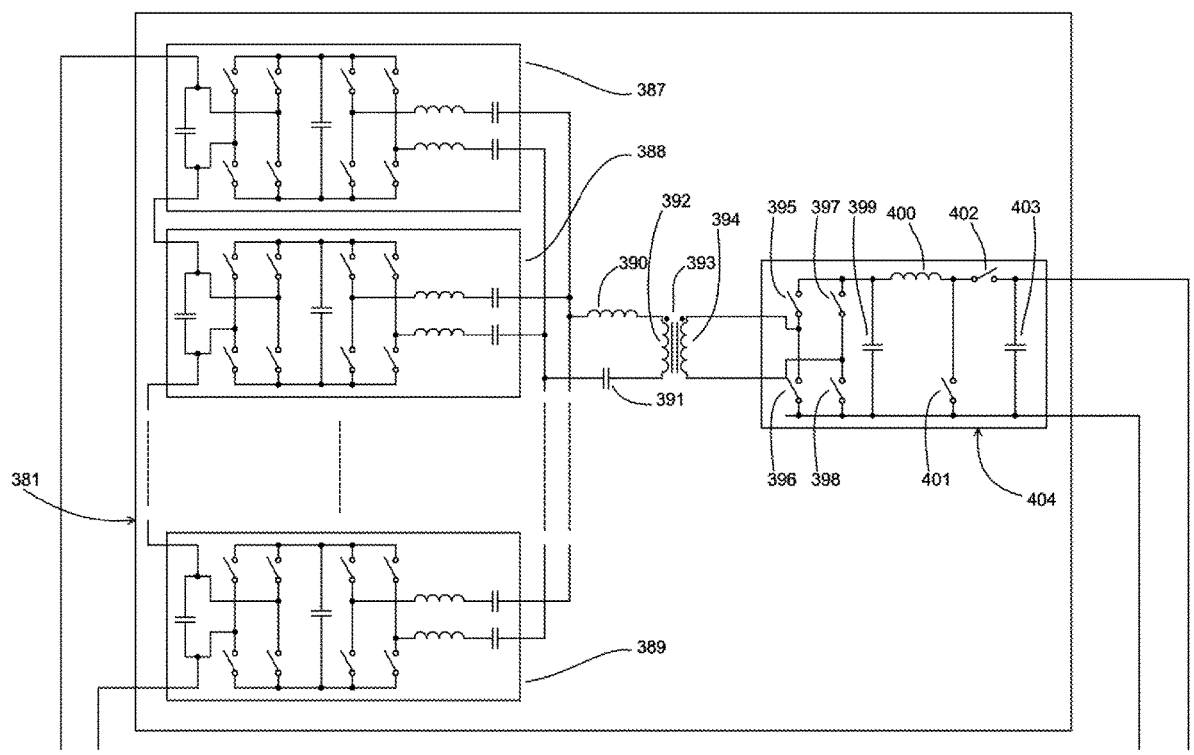
FIG. 16A is a first partial view of the schematic diagram as indicated in FIG. 16.
Figure 16B:
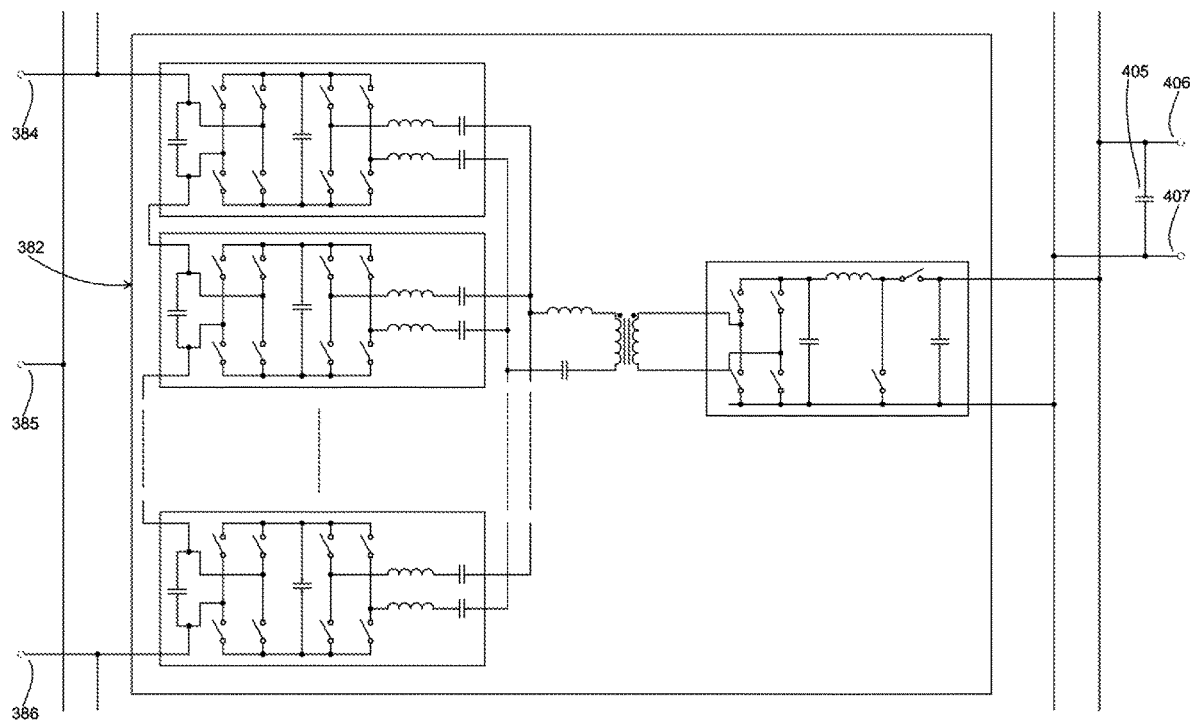
FIG. 16B is a second partial view of the schematic diagram as indicated in FIG. 16.
Figure 16C:
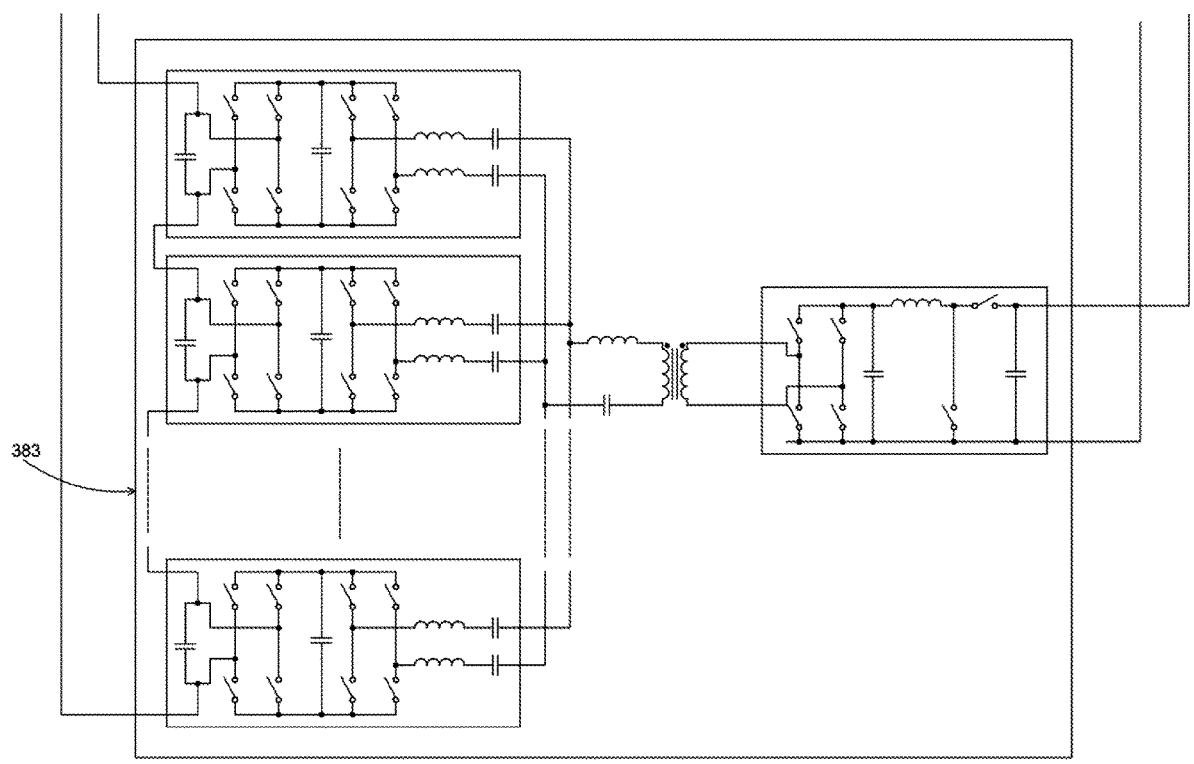
FIG. 16C is a third partial view of the schematic diagram as indicated in FIG. 16.

FIG. 16 is a schematic diagram of an exemplary power converter embodiment for three-phase AC/DC SST. This embodiment presents an exemplary three-phase AC to DC MV or HV converter based on HV converters with primary switch modules parallel driving transformer primary. When three-phase SST is needed, then the first 381, second 382 and third 383 power converters can be connected in a delta arrangement as shown. It will be evident to everyone skilled in the art that wye arrangements are also possible ways to utilize the technology of HV converters with primary switch modules parallel driving transformer primary for three-phase applications.

Additional advantages of the three-phase approach to the AC/DC medium and high voltage SST is that due to the uniform power flow of the three phase power source, the capacitor 405 does not need to be a large electrolytic capacitor, rather a smaller value capacitor may be used. In this case the capacitors inherent for each of the boost converters marked as 403 in every SST module can also be either small value or in some cases may be eliminated completely. The exemplary circuit illustrated in connection with FIG. 16 is naturally bidirectional unless the switch 402 is substituted by a diode for cost or other reasons. It is suitable to be applied in other converter topologies where multi-phase power source or multiphase load is needed.

The advantages of the exemplary power converters, components and features described above include advantages such as the one where, by paralleling the module outputs, the input voltages of the modules are forced to be equal thus dividing the HV input equally across the series modules. This allows the use of lower voltage-rated switches to improve availability and cost. The same is true if the circuit works in reverse or bidirectional ways. In those cases, it delivers high voltage by multiplying the voltage of the transformer winding. Furthermore, only one transformer is needed, and its primary voltage is equal to the input voltage of the individual module. This lower voltage design avoids high dielectric issues such as excessive primary insulation and corona effect across the primary winding. It also facilitates achieving the desired leakage and magnetizing inductance. Finally, a single module design can be replicated and used in series or in parallel to satisfy many applications.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A device for converting electrical power comprising:
a first voltage input;
a load comprising:
 a first terminal; and
 a second terminal; and
a plurality of primary switch modules connected in series across the first voltage input, wherein each primary switch module in the plurality of primary switch modules comprises:
 a first voltage blocking capacitor connected to a first switch output; and
 a second voltage blocking capacitor connected to a second switch output,
 wherein the first switch outputs of each primary switch module in the plurality of primary switch modules are connected together with the first terminal and the second switch outputs of each primary switch module in the plurality of primary switch modules are connected together with the second terminal.

2. The device of claim 1, wherein a power flow is reversed to deliver high voltage DC or mains AC.

3. The device of claim 1, wherein each primary switch module utilizes MOSFETs, IGBTs, or any other type of power semiconductor.

4. The device of claim 1, wherein each primary switch module further comprises a full bridge circuit.

5. The device of claim 1, wherein each primary switch module further comprises:
a bypass capacitor; and
a totem pole comprising a first and second switch connected in series,
wherein the bypass capacitor and the totem pole are connected in parallel to form a half bridge circuit.

6. The device of claim 1, wherein each primary switch module further comprises:
a bypass capacitor;
a first totem pole comprising two switches connected in series; and
a second totem pole comprising two switches connected in series,
wherein the bypass capacitor, the first totem pole, and the second totem pole are connected in parallel to form a full bridge circuit.

7. The device of claim 1, wherein each primary switch module further comprises:
a low frequency full bridge; and
a high frequency full bridge.

8. The device of claim 1, further comprising a high or medium frequency transformer comprising:
a primary winding comprising:
 a first terminal; and
 a second terminal; and
a secondary winding connected to the load,
wherein the first switch outputs of each primary switch module in the plurality of primary switch modules are connected together with the first terminal of the primary winding and the second switch outputs of each primary switch module in the plurality of primary switch modules are connected together with the second terminal of the primary winding.

9. The device of claim 8, wherein each voltage blocking capacitor also serves as a series resonant capacitor when the high or medium frequency transformer is being used in a power converter of a resonant type.

10. The device of claim 8, wherein the first and second switch outputs of each primary switch module in the plurality of primary switch modules are each connected together with the first and second terminals of the primary winding, respectively, via a resonant tank.

11. The device of claim 8, further comprising a secondary switch module connecting the secondary winding and the load.

12. The device of claim 11, wherein the secondary switch module comprises:
a first full bridge rectifying circuit;
a capacitor; and
a second full bridge circuit.

13. The device of claim 11, wherein the secondary switch module comprises:
a first full bridge rectifying circuit;
a capacitor; and
a boost power factor correction converter.

14. The device of claim 1, wherein the plurality of primary switch modules comprises a first plurality of primary switch modules and a second plurality of primary switch modules, and wherein the device further comprises a high or medium frequency transformer comprising:
- a first primary winding comprising:
  - a first terminal, wherein the first switch outputs of each primary switch module in the first plurality of primary switch modules are connected together with the first terminal of the first primary winding; and
  - a second terminal, wherein the second switch outputs of each primary switch module in the first plurality of primary switch modules are connected together with the second terminal of the first primary winding;
- a second primary winding comprising:
  - a first terminal, wherein the first switch outputs of each primary switch module in the second plurality of primary switch modules are connected together with the first terminal of the second primary winding; and
  - a second terminal, wherein the second switch outputs of each primary switch module in the second plurality of primary switch modules are connected together with the second terminal of the second primary winding;
- a secondary winding connected to the load.

15. The device of claim 14, wherein the first and second switch outputs of each primary switch module in the first plurality of primary switch modules are each connected together with the first and second terminals of the first primary winding, respectively, via a third voltage blocking capacitor in series with an inductor or a common mode inductor, and wherein the first and second switch outputs of each primary switch module in the second plurality of primary switch modules are each connected together with the first and second terminals of the second primary winding, respectively, via a fourth voltage blocking capacitor in series with an inductor or a common mode inductor.

16. A solid-state transformer device for converting three phase input power comprising:
- a first power converter comprising:
  - a first input terminal;
  - a second input terminal;
  - a first output terminal;
  - a second output terminal;
  - a first plurality of primary switch modules connected in series across the first and second input terminals of the first power converter, wherein each primary switch module in the first plurality of primary switch modules comprises:
    - a first switch node; and
    - a second switch node;
  - a first high or medium frequency transformer comprising:
    - a primary winding comprising:
      - a first terminal; and
      - a second terminal; and
    - a secondary winding; and
  - a secondary switch module connecting the secondary winding of the first high or medium frequency transformer and the first and second output terminals of the first power converter,
  - wherein the first switch node of each primary switch module in the first plurality of primary switch modules are connected together via a voltage blocking capacitor with the first terminal of the primary winding of the first high or medium frequency transformer and the second switch node of each primary switch module in the first plurality of primary switch modules are connected together via a voltage blocking capacitor with the second terminal of the primary winding of the first high or medium frequency transformer;
- a second power converter comprising:
  - a first input terminal;
  - a second input terminal;
  - a first output terminal;
  - a second output terminal;
  - a second plurality of primary switch modules connected in series across the first and second input terminals of the second power converter, wherein each primary switch module in the second plurality of primary switch modules comprises:
    - a first switch node; and
    - a second switch node;
  - a second high or medium frequency transformer comprising:
    - a primary winding comprising:
      - a first terminal; and
      - a second terminal; and
    - a secondary winding; and
  - a secondary switch module connecting the secondary winding of the second high or medium frequency transformer and the first and second output terminals of the second power converter,
  - wherein the first switch node of each primary switch module in the second plurality of primary switch modules are connected together via a voltage blocking capacitor with the first terminal of the primary winding of the second high or medium frequency transformer and the second switch node of each primary switch module in the second plurality of primary switch modules are connected together via a voltage blocking capacitor with the second terminal of the primary winding of the second high or medium frequency transformer; and
- a third power converter comprising:
  - a first input terminal;
  - a second input terminal;
  - a first output terminal;
  - a second output terminal;
  - a third plurality of primary switch modules connected in series across the first and second input terminals of the third power converter, wherein each primary switch module in the third plurality of primary switch modules comprises:
    - a first switch node; and
    - a second switch node;
  - a third high or medium frequency transformer comprising:
    - a primary winding comprising:
      - a first terminal; and
      - a second terminal; and
    - a secondary winding; and
  - a secondary switch module connecting the secondary winding of the third high or medium frequency transformer and the first and second output terminals of the third power converter,
  - wherein the first switch node of each primary switch module in the third plurality of primary switch modules are connected together via a voltage blocking capacitor with the first terminal of the primary winding of the third high or medium frequency transformer and the second switch node of each primary switch module in the third plurality of primary switch modules are connected together via a voltage blocking capacitor with the second terminal of the primary winding of the third high or medium frequency transformer, wherein the first and second input terminals of each of the first, second and third power converters are connected together in a three-phase arrangement and the first and second output terminals of each of the first, second and third power converters are connected together in an output arrangement.

17. The solid-state transformer device of claim 16, wherein each voltage blocking capacitor also serves as a series resonant capacitor when the high or medium frequency transformer is being used in a power converter of a resonant type.

18. The solid-state transformer device of claim 16, wherein a power flow is reversed to deliver high voltage DC or mains AC.

19. The solid-state transformer device of claim 16, wherein each primary switch module is based on MOSFETs, IGBTs, or any other type of power semiconductor.

20. The solid-state transformer device of claim 16, wherein each primary switch module further comprises a full bridge circuit.

21. The solid-state transformer device of claim 16, wherein each primary switch module further comprises:
   a bypass capacitor; and
   a totem pole comprising a first and second switch connected in series,
   wherein the bypass capacitor and the totem pole are connected in parallel to form a half bridge circuit.

22. The solid-state transformer device of claim 16, wherein each primary switch module further comprises:
   a bypass capacitor;
   a first totem pole comprising two switches connected in series; and
   a second totem pole comprising two switches connected in series,
   wherein the bypass capacitor, first totem pole and second totem poles are connected in parallel to form a full bridge circuit.

23. The solid-state transformer device of claim 16, wherein each primary switch module further comprises:
   a low frequency full bridge; and
   a high frequency full bridge.

24. The solid-state transformer device of claim 16, wherein the three-phase arrangement is a delta arrangement and the output arrangement is a wye arrangement.

25. The solid-state transformer device of claim 16, wherein the three-phase arrangement is a wye arrangement and the output arrangement is a wye arrangement.

26. The solid-state transformer device of claim 16, wherein the three-phase arrangement is a wye arrangement and the output arrangement is a delta arrangement.

27. The solid-state transformer device of claim 16, wherein the three-phase arrangement is a delta arrangement and the output arrangement is a delta arrangement.

28. The solid-state transformer device of claim 16, wherein the three-phase arrangement is a delta arrangement and the output arrangement is the first output terminals of each of the first, second and third power converters connected in parallel and the second output terminals of each of the first, second and third power converters connected in parallel.

29. The solid-state transformer device of claim 16, wherein the three-phase arrangement is a wye arrangement and the output arrangement is the first output terminals of each of the first, second and third power converters connected in parallel and the second output terminals of each of the first, second and third power converters connected in parallel.

* * * * *